US008914554B2

(12) United States Patent
Taki

(10) Patent No.: US 8,914,554 B2
(45) Date of Patent: Dec. 16, 2014

(54) COMMUNICATION NETWORK DEVICE THAT COMPARES FIRST AND SECOND IDENTIFICATION NUMBER OF PACKET TO DETERMINE IF THEY ARE IN CONFORMANCE OR NON-CONFORMANCE WITH SELF-ID PACKET

(75) Inventor: Nobuhiro Taki, Kasugai (JP)

(73) Assignee: Spansion LLC, Sunnyvale, CA (US)

( * ) Notice: Subject to any disclaimer, the term of this patent is extended or adjusted under 35 U.S.C. 154(b) by 145 days.

(21) Appl. No.: 13/279,679

(22) Filed: Oct. 24, 2011

(65) Prior Publication Data

US 2012/0151096 A1 Jun. 14, 2012

(30) Foreign Application Priority Data

Dec. 10, 2010 (JP) .................................. 2010-275936

(51) Int. Cl.
*G06F 3/00* (2006.01)
(52) U.S. Cl.
USPC .......... 710/16; 710/1; 710/9; 710/15; 710/17; 710/18; 710/19; 710/104
(58) Field of Classification Search
USPC ....................................... 710/1, 9, 15–19, 104
See application file for complete search history.

(56) References Cited

U.S. PATENT DOCUMENTS

| 6,618,361 | B1 * | 9/2003 | Park .............................. 370/257 |
| 6,658,474 | B2 | 12/2003 | Kang |
| 6,671,759 | B1 | 12/2003 | Noda et al. |
| 6,988,200 | B2 | 1/2006 | Iwamoto |
| 8,213,450 | B2 * | 7/2012 | Hatakeyama |
| 2003/0210709 | A1 * | 11/2003 | Inoue ............................. 370/469 |
| 2006/0056318 | A1 | 3/2006 | Jung |
| 2007/0248095 | A1 | 10/2007 | An |
| 2010/0161989 | A1 * | 6/2010 | Kosaki .......................... 713/171 |

FOREIGN PATENT DOCUMENTS

| JP | 7-25070 A | 1/1995 |
| JP | 2000-174753 A | 6/2000 |
| JP | 2000-354052 A | 12/2000 |
| JP | 2001-7796 A | 1/2001 |
| JP | 2002-164898 A | 6/2002 |
| JP | 2002-217928 A | 8/2002 |
| JP | 2003-078536 A | 3/2003 |
| JP | 2004-328424 A | 11/2004 |
| JP | 2005-223545 A | 8/2005 |
| JP | 2005-277978 A | 10/2005 |
| JP | 2006-087118 A | 3/2006 |

(Continued)

OTHER PUBLICATIONS

English-Language Abstract for Japanese Patent Publication No. 7-25070 A, published Jan. 27, 1995; 2 pages.

(Continued)

*Primary Examiner* — Tammara Peyton
(74) *Attorney, Agent, or Firm* — Sterne, Kessler, Goldstein & Fox P.L.L.C.

(57) ABSTRACT

A communication device including a comparison unit that compares a first identification number of which notification is provided by a packet that sequentially assigns identification numbers to a plurality of nodes in a network, and a second identification number, which is assigned to the communication device. A control unit notifies other nodes of the second identification number and that the identification number of the communication device has not been changed when the first identification number and the second identification number are in non-conformance.

15 Claims, 13 Drawing Sheets

(56) References Cited

FOREIGN PATENT DOCUMENTS

| JP | 2006-87118 A | 3/2006 |
| JP | 2007-183704 A | 7/2007 |
| JP | 2007-281839 A | 10/2007 |
| JP | 2007-295571 A | 11/2007 |

OTHER PUBLICATIONS

English-Language Abstract for Japanese Patent Publication No. 2007-281839 A, published Oct. 25, 2007; 2 pages.
Notice of Reasons for Rejection (with English Language Translation) directed to related Japanese Patent Application No. 2010-275936, mailed May 14, 2014; 7 pages.
English-Language Abstract for Japanese Patent Publication No. JP 2000-354052 A, published Dec. 19, 2000; 2 pages.
English-Language Abstract for Japanese Patent Publication No. JP 2003-078536 A, published Mar. 14, 2003; 2 pages.
English-Language Abstract for Japanese Patent Publication No. JP 2005-277978 A, published Oct. 6, 2005; 2 pages.
English-Language Abstract for Japanese Patent Publication No. JP 2007-183704 A, published Jul. 19, 2007; 1 page.
English-Language Abstract for Japanese Patent Publication No. JP 2007-295571 A, published Nov. 8, 2007; 2 pages.
English-Language Abstract for Japanese Patent Publication No. JP 2001-7796 A, published Jan. 12, 2001; 2 pages.
English-Language Abstract for Japanese Patent Publication No. JP 2002-164898 A, published Jun. 7, 2002; 2 pages.
English-Language Abstract for Japanese Patent Publication No. JP 2002-217928 A, published Aug. 2, 2002; 2 pages.
English-Language Abstract for Japanese Patent Publication No. JP 2004-328424 A, published Nov. 18, 2004; 2 pages.
English-Language Abstract for Japanese Patent Publication No. JP 2005-223545 A, published Aug. 18, 2005; 2 pages.
English-Language Abstract for Japanese Patent Publication No. JP 2006-87118 A, published Mar. 30, 2006; 2 pages.

* cited by examiner

Fig.4(a)

| 10 | phy_ID | 0 | L | gap_cnt | sp | brdg | c | pwr | p0 | p1 | p2 | i | m | SP1 |
|----|--------|---|---|---------|-----|------|---|-----|----|----|----|---|---|-----|
| | | | | logical inverse of first quadlet | | | | | | | | | | |

| 10 | phy_ID | 1 | n(0) | rsv | same | p3 | p4 | p5 | p6 | p7 | p8 | p9 | p10 | r | m | SP2 |
|----|--------|---|------|-----|------|----|----|----|----|----|----|----|------|---|---|-----|
| | | | | | | logical inverse of first quadlet | | | | | | | | | | |

Fig.4(b)

| 10 | phy_ID | i | n(1) | rsv | p11 | p12 | p13 | p14 | p15 | reserved | SP3 |
|----|--------|---|------|-----|-----|-----|-----|-----|-----|----------|-----|
| | | | | logical inverse of first quadlet | | | | | | | |

Fig.5(a)

| phy_ID | | 0 | L | gap_cnt | sp | brdg | c | pwr | p0 | p1 | m field | SP |
|---|---|---|---|---|---|---|---|---|---|---|---|---|
| 10 | | 0 | L | | | | | | | 00 | 00 | 11 |

SP1

| 10 | | 1 | n(0) | 0 0 0 00 | 00 | 00 | 00 | 00 | 00 | 00 | 00 | 00 | logical inverse of first quadlet

| phy_ID | | 0 | L | gap_cnt | sp | brdg | c | pwr | p0 | p1 | m field | SP |
|---|---|---|---|---|---|---|---|---|---|---|---|---|
| 10 | | 0 | L | | | | | | 00 | 00 | 11 |

SP1

| 10 | | 1 | n(0) | 0 1 00 | 00 | 00 | 00 | 00 | 00 | 00 | 00 | 00 | logical inverse of first quadlet

SP2

COMMUNICATION NETWORK DEVICE THAT COMPARES FIRST AND SECOND IDENTIFICATION NUMBER OF PACKET TO DETERMINE IF THEY ARE IN CONFORMANCE OR NON-CONFORMANCE WITH SELF-ID PACKET

CROSS-REFERENCE TO RELATED APPLICATIONS

This application is based upon and claims the benefit of priority from prior Japanese Patent Application No. 2010-275936, filed on Dec. 10, 2010, the entire contents of which are incorporated herein by reference.

FIELD

The present embodiments relate to a communication device.

BACKGROUND

The IEEE 1394 standard is a serial interface that couples nodes such as a personal computer and a digital camera that process a large amount of voice data and image data.

In an IEEE 1394-standard network, a single node manages the node ID of each node in the network and serves as a bus master that controls changes in the node IDs (refer to, for example, Japanese Laid-Open Patent Publication Nos. 2000-174753 and 2006-087118). In such a network, when a node serving as the bus master leaves the network or another node takes over its place, a bus resets. This reassigns a node ID to each node in the network.

In the IEEE 1394 standard, a bus reset may occur in a network due to unexpected external noise. After the bus reset, a node ID is reassigned to each node in the network. The reassigned node ID may differ from the node ID used prior to the bus reset. Thus, before communication starts, each node has to find all of its communication peer nodes (other nodes) in the network, specify the node IDs of the communication peer nodes, generate a request for collecting device information (e.g., communication speed) of the communication peed nodes, and negotiate with the communication peed nodes. Such series of processes impose a restriction to communication and delays the restarting of communication after the bus reset.

SUMMARY

One aspect of the present invention is a communication device including a comparison unit that compares a first identification number of which notification is provided by a packet that sequentially assigns identification numbers to a plurality of nodes in a network, and a second identification number, which is assigned to the communication device. A control unit that notifies other nodes of the second identification number and that the identification number of the communication device has not been changed when the first identification number and the second identification number are in non-conformance.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4(a) and 4(b) illustrate data formats of a self ID packet according to the first embodiment;

FIGS. 5(a) and 5(b) illustrate the self ID packets;

DESCRIPTION OF EMBODIMENTS

A first embodiment will now be described with reference to FIGS. 1 to 12.

Figure 2:
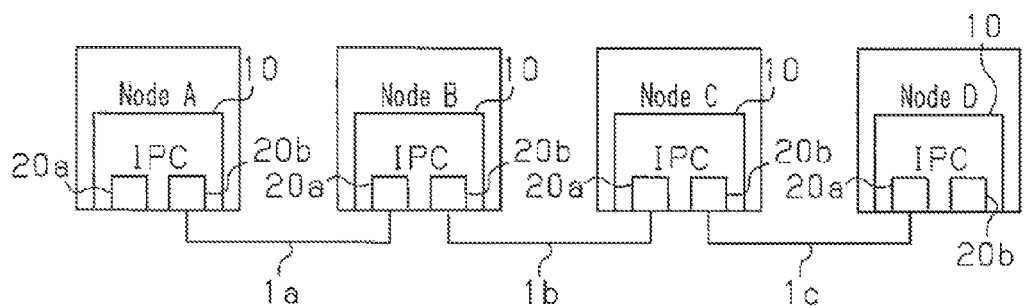
FIG. 2 is a block diagram of a network system according to the first embodiment.

First, a network system (topology) complying with a certain standard (for example, the IEEE 1394 standard) will be described with reference to FIG. 2. Devices, or nodes A to D, are coupled to an IEEE 1394 bus to communicate with each other. The node A is coupled to the node B by an IEEE 1394 bus cable 1a. The node B is coupled to the node C by a bus cable 1b. The node C is coupled to the node D by a bus cable 1c. The nodes A to D may be a coupling point such as a personal computer, a hard disk drive (HDD), a recorder, a display, a printer, or a digital camera.

Figure 3:
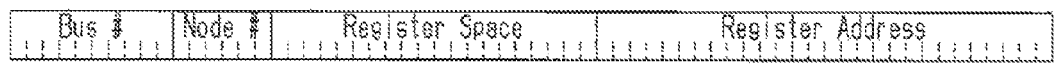
FIG. 3 is an explanatory diagram of an address space.

The nodes A to D are each assigned a unique 64-bit address space as illustrated in FIG. 3. The upper 16 bits of each address form a "node ID", which indicates a node on the IEEE 1394 bus. The upper 10 bits in the node ID form a "bus_ID", which identifies the bus. The lower 6 bits in the node ID form a "physical_ID", which identifies the node. There is a reserved address in which all the bits of the node ID are set to 1. Except for the reserved address in which all the bits are set to 1, 16-bit node IDs may be used to specify 1023 buses and 63 nodes.

Further, the remaining 48 bits in the address space are used to specify, for example, an address space allocated to each node. The nodes A to D may each perform data communication with a specified communication peer by recognizing its physical ID (narrow concept of node ID) and that of another node (narrowly-defined node IDs). The physical ID may be used as the actual node ID. Thus, in the following description, the value of the physical ID is used as the value of the node ID.

Figure 1:
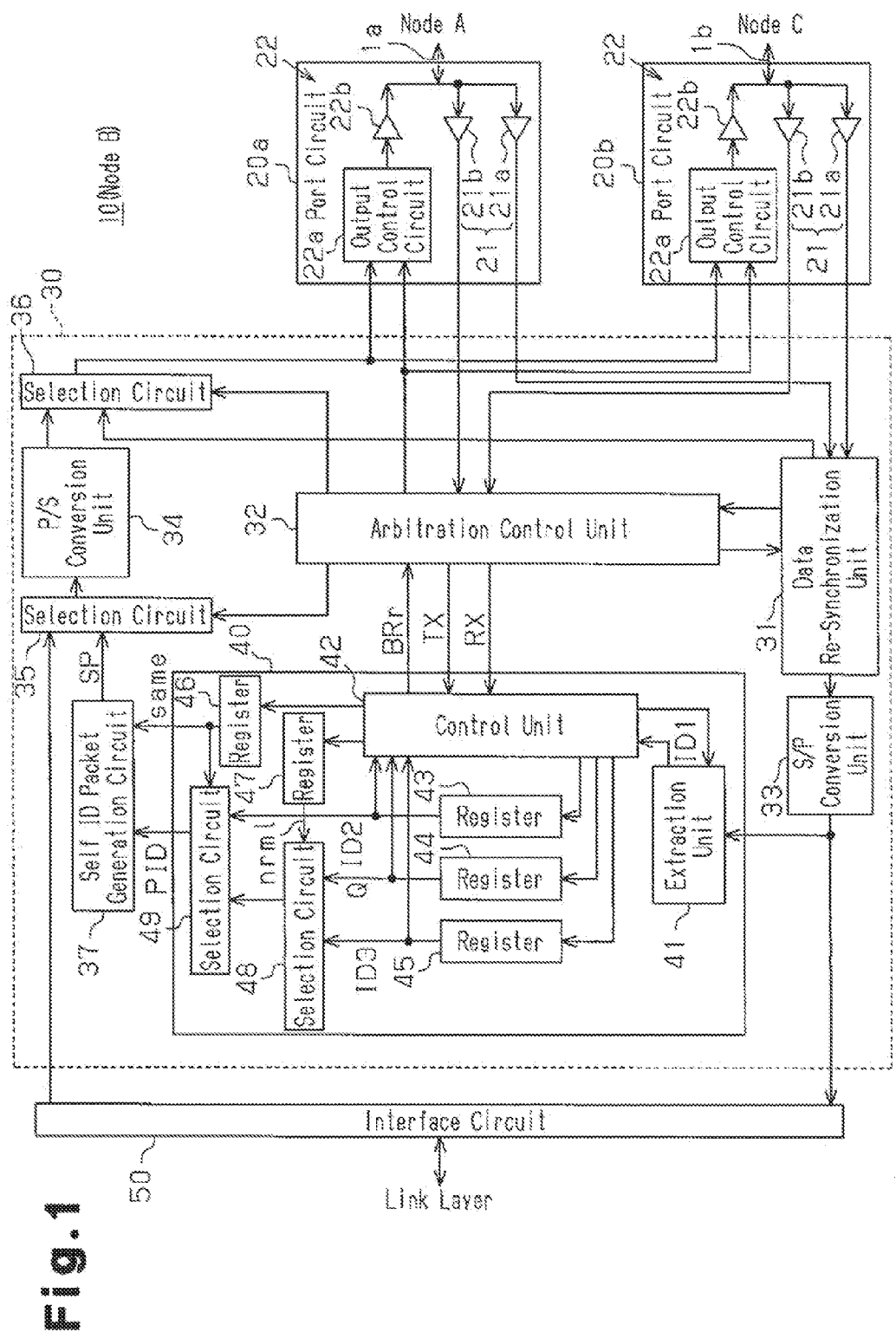
FIG. 1 is a block diagram of an IPC according to a first embodiment.

The nodes A to D each include an IEEE 1394 protocol controller 10 (IPC) that complies with the IEEE 1394 standard illustrated in FIG. 1. An example of the internal configuration of the IPC 10 will now be described. The IPC 10 including the node B will here be used as an example, and the IPC 10 of each of the nodes A, C, and D will not be described.

The IPC 10 includes a physical layer control circuit 30 coupled to port circuits 20a and 20b. The physical layer control circuit 30 is coupled to a link layer by an interface circuit 50.

A reception circuit 21 in the port circuit 20a is coupled to the node A. The reception circuit 21 converts an electrical signal received from the node A into that one used in the device and outputs the signal to the physical layer control circuit 30. The reception circuit 21 includes a receiver circuit 21a, which outputs packet data (self ID packet, isochronous packet, and the like) received from the node A to a data re-synchronization unit 31 in the physical layer control circuit 30, and a receiver circuit 21b, which outputs arbitration signal received from the node A to an arbitration control unit 32 in the physical layer control circuit 30.

A transmission circuit 22 in the port circuit 20a converts the electrical signal from the physical layer control circuit 30 into an electrical signal complying with the IEEE 1394 standard and transmits the signal to the node A. In the transmission circuit 22, an output control unit 22a selects either one of the packet data from the physical layer control circuit 30 and the arbitration control signal from the arbitration control unit 32 and outputs the selected one to the node A through a driver circuit 22b.

The port circuit 20b coupled to the node C has a configuration similar to that of the port circuit 20a. Thus, same reference characters are given to corresponding components in the port circuit 20b and the port circuit 20a. Such components of the port circuit 20b will not be described.

The physical layer control circuit 30 monitors a bus state. Further, when a bus reset occurs, the physical layer control circuit 30 performs configuration, speed signaling, arbitration, and the like. In bus configuration (bus reset sequence), information related to the bus for each node in a topology is initialized, a root node is determined, the physical ID (node ID) of each node is determined, and self ID packet for notification of the node ID is transmitted. Further, the physical layer control circuit 30 converts the electrical signals from the port circuits 20a and 20b into logical signals handled by the link layer and outputs the signals to the link layer through the interface circuit 50. The physical layer control circuit 30 converts the logical signals provided from the link layer via the interface circuit 50 into electrical signals and outputs the signals to the port circuits 20a and 20b. The link layer generates data CRC and header CRC, performs CRC check, and controls transmission and reception of packets.

In the present embodiment, the port circuits 20a and 20b, the physical layer control circuit 30, and the interface circuit 50 are provided in a physical layer of the node B.

The physical layer control circuit 30 includes the data re-synchronization unit 31, the arbitration control unit 32, a serial/parallel (S/P) conversion unit 33, a parallel/serial (P/S) conversion unit 34, selection circuits 35 and 36, a self ID packet generation unit 37 (packet generation unit), and an identification number generation unit 40.

In response to a control signal from the arbitration control unit 32, the data re-synchronization unit 31 converts packet data received from each receiver circuit 21a into a logical signal handled by the link layer and outputs the signal to the S/P conversion unit 33. Further, the data re-synchronization unit 31 outputs the received packet data to the selection circuit 36 as repeat data to perform repeat transfer of the received packet data. The data re-synchronization unit 31 provides the arbitration control unit 32 with a termination signal that indicates termination of the received packet data.

The serial/parallel (S/P) conversion unit 33 converts the logical signal (serial data) from the data re-synchronization unit 31 into parallel data and outputs the data to the link layer through the interface circuit 50. Further, the S/P conversion unit 33 converts the logical signal corresponding to a received self ID packet into parallel data and outputs the data to the identification number generation unit 40.

In response to a selection signal from the arbitration control unit 32, the selection circuit 35 selects either one of the packet data (isochronous packet etc.) from the link layer and a self ID packet SP generated by the packet generation unit 37. Then, the selection circuit 35 outputs the packet data or the self ID packet SP to the P/S conversion unit 34.

The P/S conversion unit 34 converts the packet data or the self ID packet SP into serial data and outputs the data as transmission packet data to the selection circuit 36.

In response to the selection signal from the arbitration control unit 32, the selection circuit 36 selects either one of the transmission packet data from the P/S conversion unit 34 and the repeat data from the data re-synchronization unit 31 and outputs the selected data to the output control unit 22a.

The arbitration control unit 32 is the main controller of the physical layer. The arbitration control unit 32 is provided with an arbitration signal from each of the receiver circuits 21b, a termination signal from the data re-synchronization unit 31, and a bus reset request signal BRr from the identification number generation unit 40. Based on the signals, the arbitration control unit 32 responds to a request for arbitration from the link layer, manages and controls the port circuits 20a and 20b, and resets and configures the bus. The arbitration control unit 32 supplies the identification number generation unit 40 with a transmission permission signal TX, which indicates that the transmission of a self ID packet SP of the node B itself is permitted, and a reception signal RX, which indicates that a self ID packet SP from another node has been received.

The self ID packet generation unit 37 generates a self ID packet SP having a data format illustrated in FIG. 4. For example, when the node B includes 11 port circuits or less, the packet generation unit 37 generates a self ID packet SP including a head packet SP1 and a concatenated packet SP2 concatenated to the head packet SP1 as illustrated in FIG. 4(a). When the node B includes 12 or more port circuits, the packet generation unit 37 generates a self ID packet SP including a concatenated packet SP3, which is illustrated in FIG. 4(b), with the head packet SP1 and the concatenated packet SP2, which are illustrated in FIG. 4(a). For example, if the node B has the two port circuits 20a and 20b, the packet generation unit 37 generates a self ID packet SP having the head packet SP1 and the concatenated packet SP2.

The data format of the self ID packet SP will now be described with reference to FIG. 4. Here, "10" at the head of each of the packets SP1 to SP3 indicates that the packet is a self ID packet SP. The head packet SP1 includes fields, such as phy_ID (physical_ID) indicating the physical ID of a transmission source node, L (link_active) indicating whether the link layer and the transaction layer are active, gap_cnt (gap_count) indicating the value of the current PHY_Configuration.gap_count, SP (PHY_SPEED) indicating a transmission speed capability, brdg (bridge) indicating a bridge capability, c (CONTENDER) indicating a bus or isochronous resource manager candidate, pwr (POWER_CLASS) indicating a power class, p0-p2 (NPORT) indicating a port coupling state, i (initiated_reset) indicating the node at which a bus reset is started, and m (more_packets) indicating, when set to "1", that a self ID packet SP follows.

The concatenated packet SP2 includes fields, such as the phy_ID field, an n field indicating an extended self-ID packet sequence number, an rsv field that is a reserved bit set to "0", a "same" field indicating whether the node ID is changed as a result of the bus reset, p3-p10 fields indicating a port coupling state, and the m field.

The concatenated packet SP3 includes the phy_ID field, the n field, the rsv field, a "p11-p15" field indicating a port coupling state, and the like.

The packet generation unit 37 generates a self ID packet SP by storing a physical ID number PID, which is generated in the identification number generation unit 40, in each phy_ID field, storing the same flag "same" generated in the identification number generation unit 40 in the same field of the concatenated packet SP2, and constantly storing "1" in the m field of the head packet SP1. Here, "1" is stored in the m field of the head packet SP1 in order to constantly store a value of the same flag "same" stored in the concatenated packet SP2 even when the node B has three ports or less. The self ID packet SP generated in such a manner is broadcast from the node B to the other nodes by the transmission circuit 22 and the like to notify the other nodes of the physical ID number PID stored in the phy_ID field indicating the node ID of the node B and whether the node ID has been changed as a result of the bus reset.

The identification number generation unit 40 generates a physical ID number PID which is set as the node ID of the node B, that is, a physical ID number PID which is stored in the phy_ID field of a self ID packet SP. Further, the identification number generation unit 40 generates the same flag "same" indicating whether the node ID of the node B is changed as a result of the bus reset. An example of the internal configuration of the identification number generation unit 40 will now be described.

The self ID packet SP received by a node from another node undergoes S/P conversion in the S/P conversion unit 33 and is provided to an extraction unit 41. The extraction unit 41, in response to an ENABLE signal from a control unit 42 in the identification number generation unit 40, extracts a first identification number ID1, which indicates the physical ID of the transmission source node (node ID of the other node) from the phy_ID field of the received self ID packet, and outputs the extracted first identification number ID1 to the control unit 42.

Figure 6:
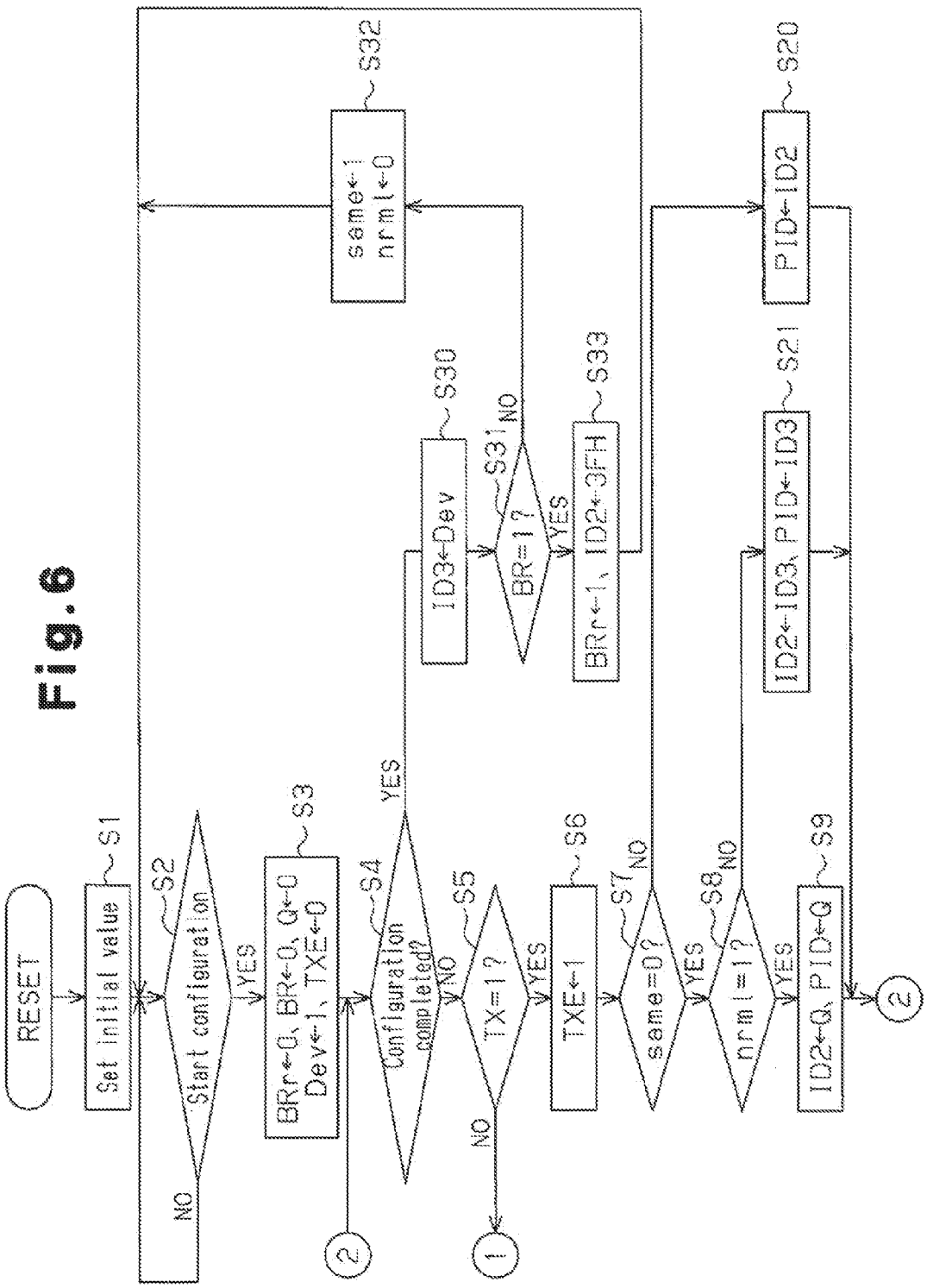
FIGS. 6 to 7 are flowcharts illustrating a process for setting a node ID.
Figure 7:
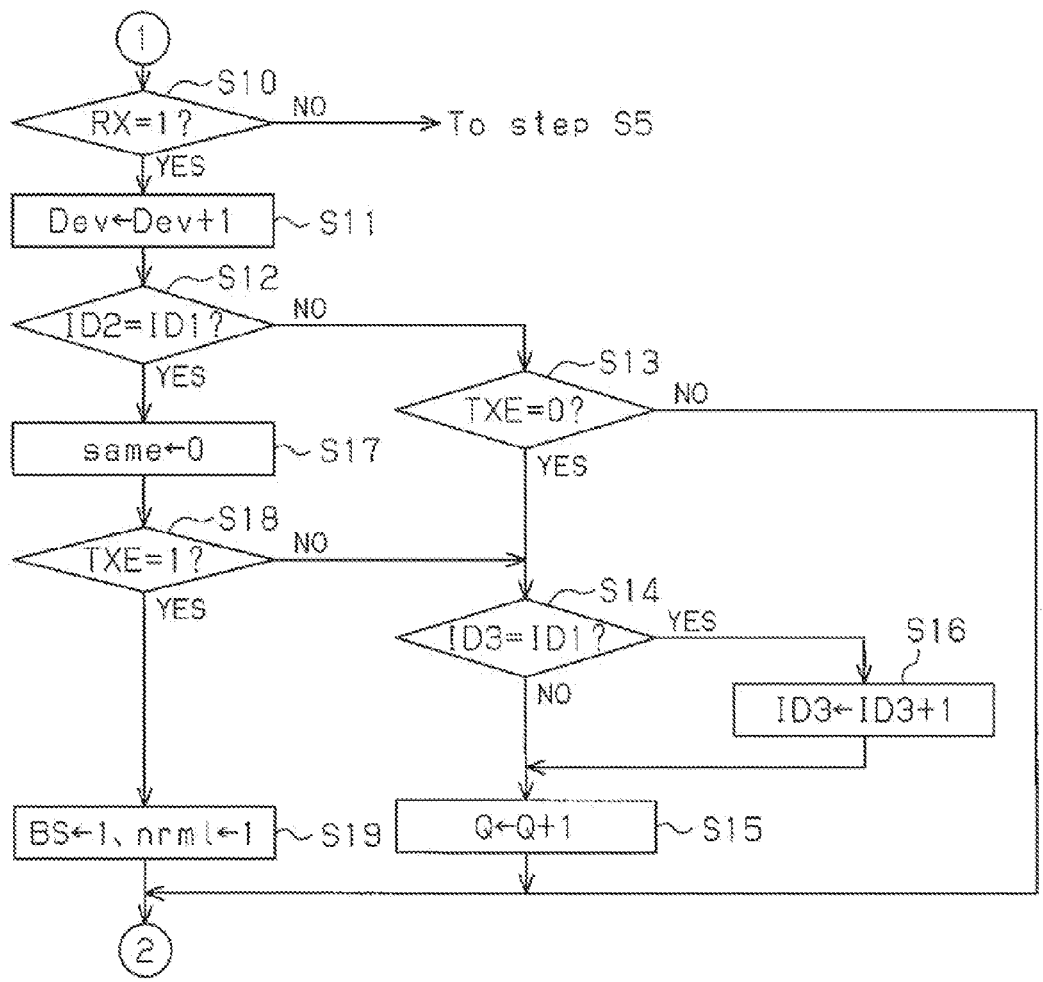
Figure 8:
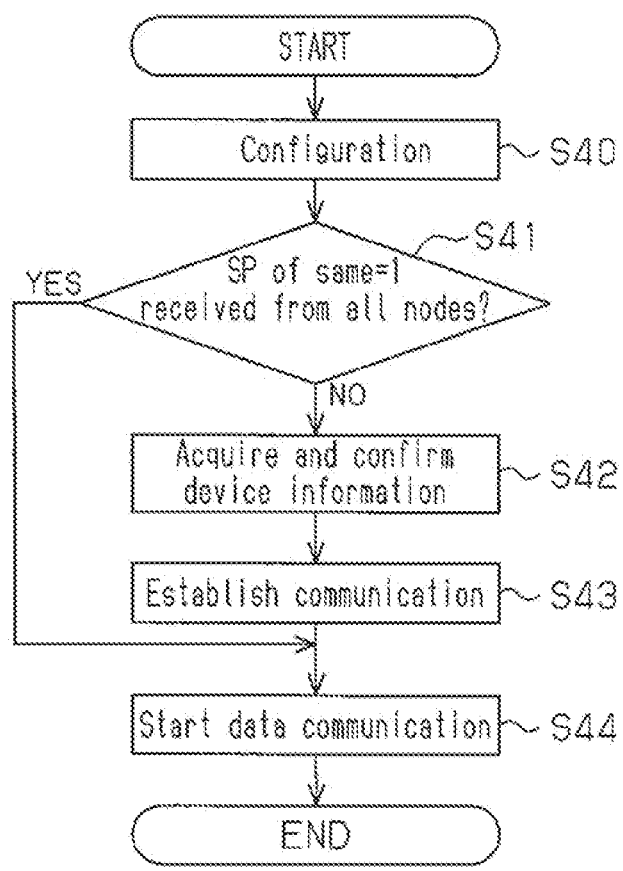
FIG. 8 is a flowchart illustrating operations of the network system.

The control unit 42 performs a setting process illustrated in flowcharts in FIGS. 6 and 7. The control unit 42 stores a node ID set in the node B most recently, for example, a second identification number ID2 that indicates a node ID of the node B in the preceding topology before the bus reset in a register 43, stores a self ID count value Q which is generated when forming the current topology in a register 44, and stores a value differing from the second identification number ID2 in a register 45. In this example, the different value is a third identification number ID3 that indicates the number of devices (the number of nodes) in the preceding topology. Further, the control unit 42 stores the same flag "same" in a register 46, stores a normal flag nrml in a register 47, and outputs the bus reset request signal BRr to the arbitration control unit 32.

The same flag "same" is a bit that indicates whether the node ID of the node B is changed as a result of the bus reset, as described above. In the illustrated example, the control unit 42 sets the same flag "same" to "1" when the first identification number ID1 (node ID set to the other node) and the second identification number ID2 (node ID of the node B before the bus reset) do not conform before the node ID of the node B is set (before the self ID packet SP generated by the node is transmitted). The same flag "same" set to 1 indicates that the node ID of the node B is not changed as a result of the bus reset. On the other hand, when the first identification number ID1 and the second identification number ID2 conform with each other, the control unit 42 sets the same flag "same" to "0". The same flag "same" set to 0 indicates that the node ID of the node B is changed as a result of the bus reset The normal flag nrml is a bit that indicates whether to perform bus configuration in the conventional manner. In the illustrated example, upon the first bus initialization after resetting (power_reset), the control unit 42 sets the normal flag nrml to "1" to perform configuration in the conventional manner. Further, the control unit 42 also sets the normal flag nrml to "1" when the set node ID of the node B (second identification number ID2) conforms to the first identification number ID1 (node ID set to the other node). When the normal flag nrml is not set to "1", the control unit 42 sets the normal flag nrml to "0" to perform a sequence differing from the conventional configuration.

The second and third identification numbers ID2 and ID3 respectively stored in the registers 43 and 45 and the self ID count value Q stored in the register 44 are output to the control unit 42. Further, the self ID count value Q and the third identification number ID3 are output to a selection circuit 48, while the second identification number ID2 is output to a selection circuit 49.

The same flag "same" stored in the register 46 is output to the selection circuit 49 and the packet generation unit 37. Further, the normal flag nrml stored in the register 47 is output to the selection circuit 48.

In response to the value of the normal flag nrml, the selection circuit 48 selectively provides the selection circuit 49 with either the self ID count value Q or the third identification number ID3. In the illustrated example, the selection circuit 48 outputs the third identification number ID3 to the selection circuit 49 when the normal flag nrml is "0" and outputs the self ID count value Q to the selection circuit 49 when the flag is "1".

In response to the value of the same flag "same", the selection circuit 49 selects either one of the second identification number ID2 and a value from the selection circuit 48. Then, the selection circuit 49 outputs the selected value to the packet generation unit 37 as a physical ID number PID. In the illustrated example, when the same flag "same" is "0", the selection circuit 49 outputs the value from the selection circuit 48 (the self ID count value Q or the third identification number ID3) to the packet generation unit 37 as the physical ID Number PID. On the other hand, if the same flag "same" is "1", the selection circuit 49 outputs the second identification number ID2 to the packet generation unit 37 as the physical ID number PID.

The nodes A to D are examples of communication devices, the extraction unit 41 and the control unit 42 form an example of a comparison unit, and the packet generation unit 37 and the identification number generation unit 40 form an example of the control unit.

Next, the operation of a network system including the nodes A to D, in particular, those of the identification number generation unit 40 in each of the nodes A to D will now be described with reference to FIGS. 5 to 12.

Figure 9:
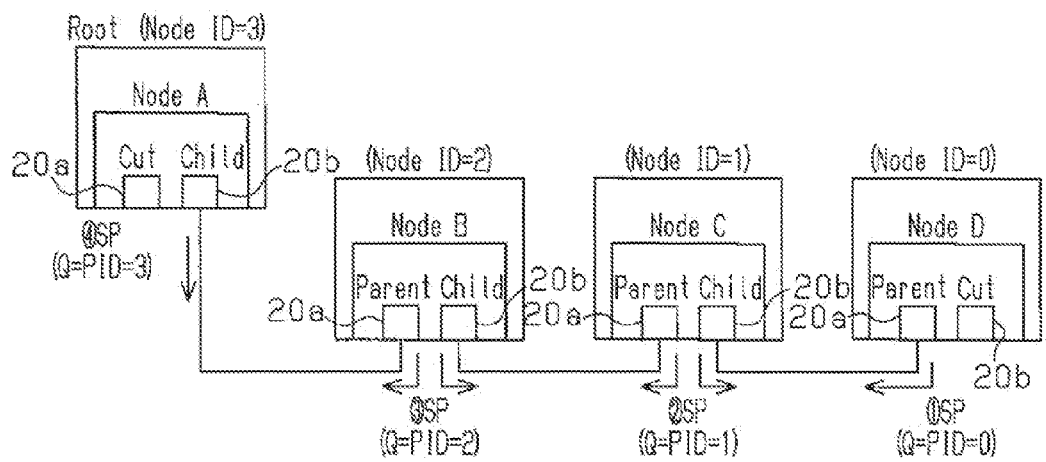
FIGS. 9 to 13 are explanatory diagrams illustrating a process for setting the node ID.

When the nodes A to D illustrated in FIG. 9 are activated (power_reset), each parameter is set to an initial value (step S1 in FIG. 6). In the illustrated example, to indicate that the same flag "same" is "0", the normal flag nrml is "1", and the node's self ID packet SP is not transmitted, a transmission completion flag TXE is set to "0", the self ID count value Q is set to "0", the second identification number ID2 is set to "3FH", the third identification number ID3 is set to "3FH", a device quantity Dev indicating the number of the nodes in a topology is set to "0", a bus reset flag BR that generates a bus reset is set to "0", and the bus reset request signal BRr is set to "0". Here, "H" represents a hexadecimal.

Subsequently, the IPC 10 in each of the nodes A to D starts bus configuration (i.e., bus initialization, tree identification, and self identification are performed in this order) (step S2). For example, first, in a bus initialization phase, a bus reset is generated. This deletes related to the topology in each node. After the bus initialization ends, some of the parameters are each set to a certain value (step S3). In the illustrated example, in the same manner as the initialization described above, the bus reset flag BR, the bus reset request signal BRr, the self ID count value Q, and the transmission completion flag TXE are all set to "0". Further, the device quantity Dev is set to "1", which indicates the number of the nodes.

Then, in a tree identification phase, a tree-shaped topology illustrated in FIG. 9 is formed. In accordance with the activation order and the coupling state, one of the nodes is determined as the root node (permission device). In the illustrated example, the node A is determined as the root node. In the following self identification phase, the nodes A to D are each automatically assigned a physical ID (node ID). In the first bus configuration after resetting (power_reset), in the same manner as the conventional sequence, as illustrated in FIG. 9, the nodes D, C, B, and A are respectively assigned node IDs "0", "1", "2", and "3" in this order.

The processing performed from determination of the root node to setting of the node IDs will now be described in detail.

After the bus reset is generated, a parent-child relationship among the port circuits of the nodes A to D is set so that the nodes A to D may be handled as those coupled in a tree form. For example, after a bus reset occurs, a leaf node to which one other node is coupled outputs a parent_notify signal after a certain time determined for each lead node elapses. In the illustrated example, the port circuit 20*a* in the node D first outputs the parent_notify signal. A branch node (for example, the node C) to which at least two other nodes are coupled outputs a child_notify signal to the port circuit 20*b* in the node that has received the parent_notify signal after it received the parent_notify signal and a certain time determined for each branch node elapsed. Further, the branch node C outputs the parent_notify signal to the remaining port circuit 20*a* of the node. This sets the port circuit 20*a* in the node D to a "parent port" and the port circuit 20*b* in the node C is set to a "child port". Such processing is repeated to set the "parent-child" relationship between the port circuit 20*a* in the node C and the port circuit 20*b* in the node B and, subsequently, set the "parent-child" relationship between the port circuit 20*a* in the node B and the port circuit 20*b* in the node A. After the parent-child relationship is set between the port circuits of all the nodes, the node (the node A in this example) of which ports are all set as the "child port" is set to the root node. As illustrated in FIG. 9, the port circuit to which none of the other nodes is coupled is set to "off".

When the root node is determined, the root node A outputs a grant signal to one its port circuits. In the illustrated example, the root node A outputs the grant signal to the port circuit that has the smallest port number (in this example, the port circuit 20*b* in the root node A). The grant signal is received by the parent port of the other node and outputs from the child port of that other node, thereby propagating to the other nodes one after another. When a node having no child port, namely, a leaf node (the node D in this example) receives the grant signal, the setting of the node ID of the node D is started (transmission of the self ID packet SP). The setting of the node ID in the node D (in particular, the identification number generation unit 40 and the packet generation unit 37) will now be described.

In step S4 in FIG. 6, when bus configuration (self identification phase) has not yet been completed, the control unit 42 in the node D determines whether or not the transmission permission signal TX from the arbitration control unit 32 is "1" (step S5). As described above, in the node D, the transmission permission signal TX is set to "1" because it has received the grant signal (YES in step S5). Thus, the control unit 42 sets the transmission completion flag TXE to "1" (step S6). The transmission completion flag TXE may be stored in, for example, the control unit 42.

Subsequently, the same flag "same" is set at its initial value of "0" (YES in step S7) and the normal flag nrml is set at its initial value of "1" (YES in step S8). Thus, the control unit 42 sets the current self ID count value Q (=0) in the register 43 as the second identification number ID2 (step S9). Further, the selection circuits 48 and 49 in the identification number generation unit 40 outputs the self ID count value Q (=0) to the packet generation unit 37 as the physical ID number PID (step S9). Then, the node D broadcasts the self ID packet SP including the physical ID number PID (=0) which provides the node ID of the node D and information of the same flag "same" (=0) (refer to FIG. 5(*a*)). As described above, in the self ID packet SP, "1" is set in the m field of the head packet SP1 so that the concatenated packet SP2 including the information of the same flag "same" may be transferred even when the number of the port circuits is three or less.

In this manner, in the physical layer control circuit 30 of the node D, the self ID count value Q generated by the identification number generation unit 40 is used as the node ID of the node D. The physical layer control circuit 30 transfers the self ID packet SP including this self ID count value Q (node ID) in its phy_ID field to the other nodes A to C. This acquires the node ID of the node and notifies the other nodes of the node ID. Then, due to the transmission of such a self ID packet, as illustrated in FIG. 9, the node ID of the node D is set to "0" and the other nodes A to C are notified of the information of the same flag "same"=0.

If the node ID of the node is not set when the nodes A to C have each received the self ID packet SP, the identification number generation unit 40 in each of the nodes A to C acquires the node ID set in the other node D from the phy_ID field in the received self ID packet SP and increments the self ID count value Q in the register 44. The processing performed by the identification number generation unit 40 (in particular, the control unit 42) in each of the nodes A to C will now be described.

When the configuration (self identification phase) has not been completed in step S4 of FIG. 6, the control unit 42 determines whether or not the transmission permission signal TX from the arbitration control unit 32 is "1" (step S5). In this example, the grant signal is already output to the other node D and the transmission permission signal TX is "0" (NO in step S5) so that the processing shifts to step S10 in FIG. 7. In this step S10, the control unit 42 determines whether or not the received signal RX is "1", that is, whether or not the self ID packet SP is received from the other node. In this case, the self ID packet SP has already been received from the other node (YES in step S10). Thus, the control unit 42 increments the device quantity Dev (step S11). As a result, the device quantity Dev is set to "2" in each of the nodes A to C.

Subsequently, when the self ID packet SP received from the other nodes D is provided to the extraction unit 41, the extraction unit 41 extracts the physical ID (=0) as the first identification number ID1 from the self ID packet SP. Then, the control unit 42 determines whether or not the first identification number ID1 (=0) conforms to the second identification number ID2 (in this example, the initial value of "3FH") of its node. In this example, non-conformance is determined (NO in step S12). Thus, the processing shifts to S13. Here, the initial value (=3FH) of the second identification number ID2 is set so the first identification number ID1 does not conform to the second identification number ID2 in step S12 during the first bus configuration after resetting. In accordance with the IEEE 394 standard, each bus is capable of coupling up to 63 nodes. Thus, when the node IDs are assigned sequentially from "0", the largest node ID would be "62". That is, the initial value of "3FH (63 in decimal)" of the second identification number ID2 is set to such a value as not to be set as the node ID even when the maximum number of nodes are coupled to a single bus, that is, not to be extracted as the first identification number ID1.

Since the self ID packet SP of the node has not been transmitted yet (YES in step S13), the control unit 42 next determines whether or not the first identification number ID1 (=0) conforms to the third identification number ID3 (in this example, the initial value of "3FH") of the node (step S14). In this example, non-conformance is determined (NO in step S14). Thus, the control unit 42 increments the self ID count value Q. As a result, the self ID count value Q in each of the nodes A to C becomes "1". That is, among the self ID packets of the other nodes received before the self ID packet is transmitted by the node, the self ID count value Q indicates the number of the self ID packets SP that have a physical ID (phy_ID) that does not conform to the third identification number ID3 of the node.

When the setting of the node ID of the node D ends in such a manner, the node D outputs an ident_done signal from the parent port circuit 20a. When receiving the ident_done signal, the node C issues the grant signal to the port circuit of which the node ID has not been set yet. Then, the node (in this case, the node C) in which all of the child ports of the node have received the ident_done signal starts to set the node ID of the node. The setting of the node ID is performed in the steps S4 to S9 (see FIG. 6). In this case, the current self ID count value Q (=1) is set to the second identification number ID2, and the self ID count value Q (=1) is output to the packet generation unit 37 as a physical ID number PID (step S9). Then, a self ID packet SP including this physical ID number PID (=1) and information of the same flag "same" (=0) is broadcast from the node C. As a result, as illustrated in FIG. 9, the node ID of the node C is set to "1".

The control unit 42 of each of the nodes A, B, and D receiving the self ID packet SP performs steps S10 to S13 as described above. That is, the device quantity Dev is incremented (step S11) so that the first identification number ID1 (=1) extracted from the received self ID packet SP does not conform to the second identification number ID2 of the node (NO in step S12). Then, the nodes A and B in which the node ID has not been set increment the self ID count value Q to "2" (step S15). The node in which the node ID of the node has been set does not increment the self ID count value Q because the transmission completion flag TXE is "1". In this case, the processing returns to step S4 in FIG. 6.

Subsequently, in the same manner, as illustrated in FIG. 9, the node IDs of the nodes B and A are determined in this order based on the self ID count value Q that is equal to the number of the self ID packets SP received from another node. In the illustrated example, the node ID of the node B is set to "2" and the node ID of the root node A is set to the largest value of "3".

As described above, in the first configuration after resetting, the node IDs of the nodes A to D are automatically set in a manner similar to the conventional sequence (sequence that sets the node IDs in accordance with the number of the received self ID packets SP). Then, when the node ID of each of the nodes A to D are set and the self ID packet SP is transmitted from all of the nodes A to D, the self identification phase is completed. This completes the bus configuration (YES in step S4 in FIG. 6).

Then, the control unit 42 in each of the nodes A to D sets the current device quantity Dev to the third identification number ID3 (step S30). In this example, the device quantity Dev in each of the nodes A to D is "4", which is the total number of the nodes in the topology. Thus, the third identification number ID3 is set to "4" in each of the nodes A to D. Subsequently, the bus reset flag BR is still "0" in each of the nodes A to D (NO in step S31). Further, the same flag "same" is set to "1" and the normal flag nrml is set to "0" (step S32). Then, the processing returns to step S2, and the identification number generation units 40 in each of the nodes A to D wait for the next bus reset to occur.

When the configuration is completed as described above (step S40 in FIG. 8), the physical layer control circuit 30 in each of the nodes A to D determines whether or not the self ID packet SP storing same=1 is received from all of the other nodes (step S41). In this example, same=0 is already stored in the self ID packet SP output from each of the nodes A to D (NO in step S41). Thus, the processing shifts to step S42. In step S42, each of the nodes A to D acquires and checks device information for nodes that have not yet transmitted the self ID packet SP storing same=1. In this case, each of the nodes A to D reads a configuration ROM or the like of each of the other nodes. The configuration ROM stores a company ID that identifies the manufacture, a chip_ID that identifies the chip, a vender_ID that identifies the module manufacturer, information unique to a node such as serial number, and function information such as whether the device is a transmitter or a receiver. Thus, by reading such information, each of the nodes A to D may recognize the types of the devices currently coupled to the bus.

Subsequently, each of the nodes A to D performs communication establishment processing (confirmation of communication contents and acquirement of bands) in accordance with a protocol (step S43). For example, when each of the nodes A to D is an audio visual device, a channel or the like is set in accordance with an AV/C protocol. When communication is established by such processing, data communication starts between the nodes A and D (step S44).

The operation performed when a bus reset is generated due to noise or the like will now be described with reference to FIG. 10.

For example, when the bus cable 1b coupling the nodes B and C to each other is affected by noise such as static charge, loss of synchronization between the nodes B and C may be detected. In this case, a bus reset occurs, and bus configuration is started (step S2 in FIG. 6). More specifically, after bus resetting, some of the parameters are set to certain values as described above (step S3). Then, in the tree identification phase, a tree-shaped topology illustrated in FIG. 10 is formed. One of the nodes is determined as the root node in accordance with the activation order and coupling state. In this example, the node B is determined as the root node. That is, the topology structure (node coupling state) is the same before (FIG. 9) and after (FIG. 10) the bus reset. However, the root node is changed from the node A to the node B. Then, in the self identification phase after bus resetting, the node ID of each of the nodes A to D is determined. Here, when the nodes A to D in the topology each include the IPC 10 illustrated in FIG. 1 like in the present embodiment, the same node ID as that before the bus reset is set to each of the nodes A to D. That is, the node IDs of the nodes D, C, B, and A are set to "0", "1", "2", and "3", respectively. The processing for setting the node ID will now be described in detail.

Figure 10:
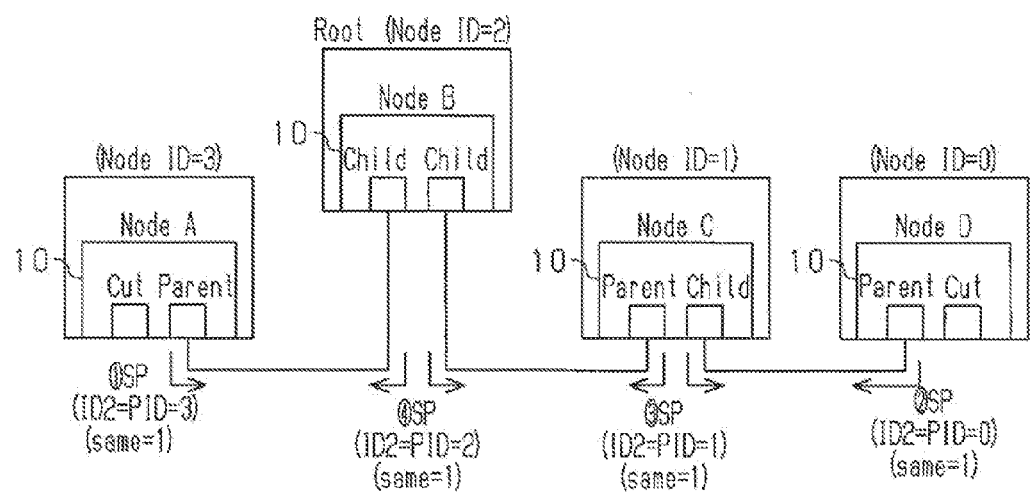

Referring to FIG. 10, among the nodes A to D, the leaf node that first receives the grant signal (in this case, the node A) starts setting the node ID (transmission of the self ID packet SP). When the node ID is set in the conventional sequence, the current self ID count value Q (=0) is set as the node ID of the node A. Thus, in the leaf node of the conventional sequence, the node ID (=3) before the bus reset is set differently from the node ID (=0) after bus resetting. That is, in the conventional sequence, the node ID set for the same node changes before and after a bus reset.

In contrast, in the node A including the IPC 10 of the present embodiment, the following processing is performed so that the node ID does not change before and after a bus reset.

In detail, the configuration is not yet completed (NO in step S4 in FIG. 6) and the transmission permission signal TX from the arbitration control unit 32 is "1" (YES in step S5). Thus, the control unit 42 in the node A sets the transmission completion flag TXE to "1" (step S6).

Subsequently, the control unit 42 determines whether the same flag "same" is "0" or "1" (step 7). In this example, the node A does not receive the first identification number ID1 that conforms to the second identification number ID2 (=3) before transmission of the self ID packet SP that it generated. Thus, the same flag "same" is still "1" as set in step S32 (NO in step S7). Thus, the identification number generation unit 40 provides the packet generation unit 37 with the second identification number ID2 (=3), namely, the node ID of the node A before the bus reset as a physical ID number PID (step S20). Here, the register 46 outputs the same flag "same" set to "1" to the generation unit 37. As illustrated in FIG. 10, the node A transmits the self ID packet SP (see FIG. 5(b)) including the physical ID number PID (=3) that provides the node ID of the node A and information of the same flag "same" (=1). That is, the physical ID number PID (=3), which is the same as the node ID of the node A before the bus reset, and the information (same=1) indicating that the node ID is not changed as a result of the bus reset of which notification is provided by the self ID packet SP to the other nodes B to D. This sets the node ID of the node A to "3", which is the same as the value before the bus reset.

When receiving the self ID packet SP, the nodes B to D performs steps S10 to S15 as described above (see FIG. 7). As a result, the device quantity Dev becomes "2" in each of the nodes B to D, and the ID self count value Q in each of the nodes B to D becomes "1".

Subsequently, a node ID is set for the next node D. In the same manner as the node A, the node D has not yet receive the first identification number ID1 that conforms to the second identification number ID2 (=0) before the self ID packet SP generated by the node is transmitted. Thus, the same flag "same" in the node D remains set to "1" (NO in step S7 in FIG. 6). Accordingly, the identification number generation unit 40 provides the packet generation unit 37 with the second identification number ID (=0), that is, the node ID of the node D before the bus reset as a physical ID number PID (step S20). In this state, the register 46 outputs the same flag "same" set to "1" to the packet generation unit 37. Then, as illustrated in FIG. 10, the node D transmits the self ID packet SP to notify the other nodes A to C of the same physical ID number PID (=0) as the node ID of the node D before the bus reset and information (same=1) indicating that the bus reset has not changed the node ID. This sets the node ID of the node D to "0", which is the same as the value before the bus reset.

Then, the nodes C and B have not yet received the first identification number ID1 that conforms to the second identification number ID2 before the self ID packet SP generated by the node is transmitted. Thus, in each of the nodes C and B, the second identification number ID2 is set as the node ID. Then, the nodes C and B each transmit the self ID packet SP to notify the other nodes of the same physical ID number PID as the node ID before the bus reset and information (same=1) indicating that the bus reset has not changed the node ID. This sets the node ID of the node C to "1", which is the same as the value before the bus reset. Finally, the node ID of the root node B is set to "2", which is the same as the value before the bus reset.

When the configuration is completed in such a manner (YES in step S4), the control unit 42 in each of the nodes A to D sets the current device quantity Dev (=4) to the third identification number ID3 (step S30), resets the same flag "same" to "1", and resets the normal flag nrml to "0" (step S32). Thus, even when a bus reset occurs the next time, the nodes A to D operate so that the node ID may not change as a result of the bus reset.

As described above, in the network system of the present embodiment, even when a bus reset occurs due to noise or the like, the node IDs of each of the nodes A to D are automatically set to the same node IDs as those before the bus reset. Further, each of all the nodes A to D notifies all of the other nodes of information (same flag "same"=1) indicating that the node ID of the node has not changed as a result of the bus reset. Based on the information of "same flag=1", each of the nodes A to D may determine that the node of the other nodes has not been changed by the bus reset. Accordingly, when each of the nodes A to D has received the self ID packet SP of "same=1" from all of the other nodes (YES in step S41 in FIG. 8), the device information acquisition and recognition processing (step S42) as well as the communication establishment processing (step S43) are not performed. Thus, data communication immediately restarts after the bus reset (step S44). This immediately restarts data communication after configuration completion in the same manner as prior to the bus resetting.

Next, the operation performed when two nodes E and F are added to the network system illustrated in FIG. 10 will be described with reference to FIG. 11. In the illustrated example, the port circuit 20a of a node E including the IPC 10 illustrated in FIG. 1 is newly coupled to the port circuit 20a of the node A, and the port circuit 20a of a node F including the IPC 10 is newly coupled to the port circuit 20b of the node E.

When the nodes E and F are added, a bus reset occurs to start bus configuration (step S2), set some of the parameters to certain values (step S3), and determine one of the nodes (in this example, the node A) as the root node. Then, the setting of node IDs is started for the nodes. In this case, the newly added nodes E and F are entered into the configuration for the first time since resetting. Thus, node IDs are set for the nodes E and F based on a self ID count value Q.

Figure 11:
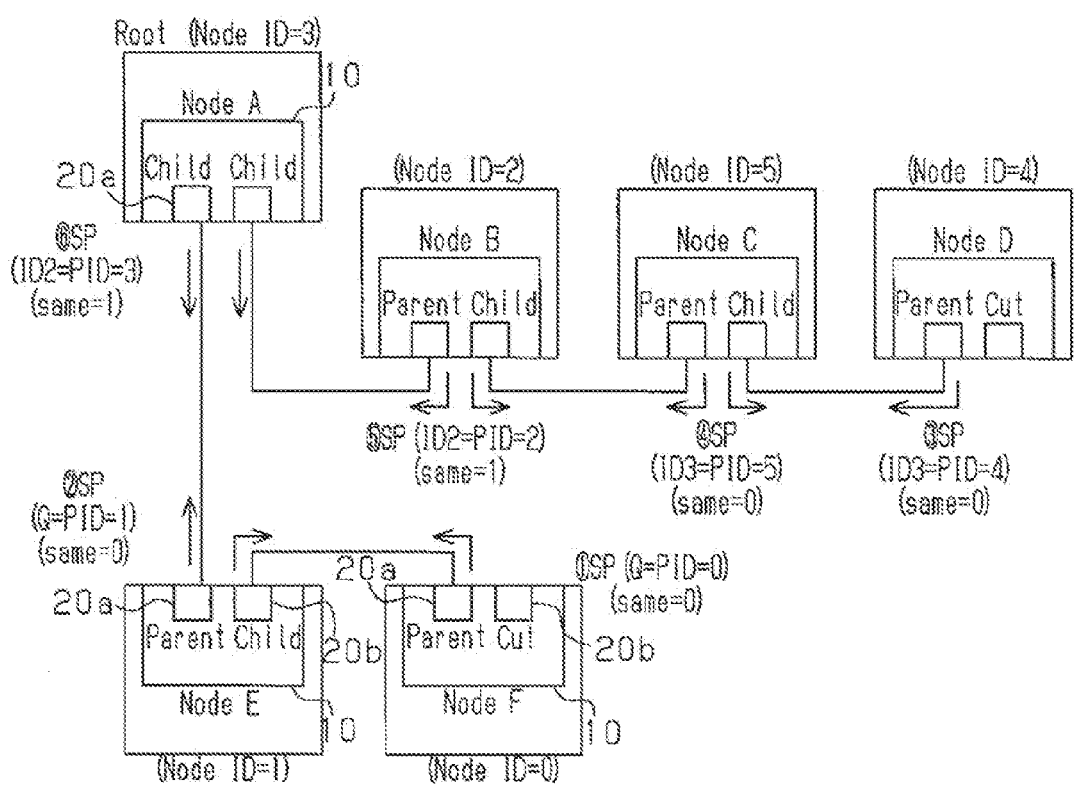

In detail, as illustrated in FIG. 11, the leaf node (in this example, the node F) that has received the grant signal first starts transmission of a self ID packet SP. At this point in time, in the node F, the same flag "same" is set at the initial value of "0" (YES in step S7 in FIG. 6), and the normal flag nrml is set at the initial value of "1" (YES in step S8). Accordingly, the current self ID count value Q (=0) is set to the second identification number ID2, and the self ID count value Q is output as the physical ID number PID to the packet generation unit 37 (step S9). Then, as illustrated in FIG. 11, the node F broadcasts the self ID packet SP including the physical ID number PID (=0) and information of the same flag "same" (=0). This sets the node ID of the node F to "0".

When the node D receives the self ID packet SP transmitted from the node F, the control unit 42 in the node D increments the device quantity Dev (step S11) and determines whether or not the first identification number ID1 (=0) extracted from the self ID packet SP conforms to the second identification number ID2 (=0) of the node D itself (step S12). In this example, conformance is determined (YES in step S12). Thus, the control unit 42 sets the same flag "same" to "0" (step S17). Subsequently, the transmission completion flag TXE is set to "0" (NO in step S18), and the first identification number ID1 (=0) does not conform to the third identification number ID3 (=4) of the node (NO in step S14). Thus, the control unit 42 increments the self ID count value Q and returns to step S4. The other nodes A to C and E perform steps S10 to S15. This sets the self ID count value Q in each of the nodes A to E to "2" (step S15).

Subsequently, a node ID is set for the next node E. The node E is an added node like the node F. Thus, the current self ID count value Q (=1) is output as the physical ID number PID to the packet generation unit 37 (step S9). Then, the node E broadcasts the self ID packet SP including the physical ID number PID (=1) and information of the same flag "same" (=0) as illustrated in FIG. 11. This sets the node ID of the node E to "1".

When the node C receives the self ID packet SP transmitted from the node E, the control unit 42 in the node C performs steps S10 to S12, S17, and S18. More specifically, the first identification number ID1 (=1) extracted from the self ID packet SP conforms to the second identification number ID2 (=1) of the node (step S17). Thus, the control unit 42 in the node C sets the same flag "same" to "0". Then, the control unit 42 performs steps S14 and S15. Nodes A, B, and D, in which the node ID is not set perform steps S10 to S15. The node F, in which the node ID has been set, performs steps S10 to S13.

Subsequently, a node ID is set for the next node D. The control unit 42 in the node D has already received the identification number ID1 that conforms to the second identification number ID2 of the node, the same flag "same" is set at "0" in the step S17 (YES in step S17), and the normal flag nrml is set at "0" (NO in step S8). Thus, the identification number generation unit 40 in the node D provides the packet generation unit 37 with the third identification number ID3 (=4), that is, the device quantity Dev, which is the total number of the nodes in the preceding topology as the physical ID number PID (step S21). In this state, the same flag "same", which is "0", is output from the register 46 to the packet generation unit 37. Then, the node D transmits the self ID packet SP to notify the other nodes A to C, E, and F of the physical ID number PID (=4), which has been changed from the node ID before the bus reset, and information (same=0) indicating that the bus reset has changed the node ID as illustrated in FIG. 11. This sets the node ID of the node D to "4". In this case, the value of the third identification number PID3 is set to the device quantity Dev of the preceding topology so that it is a value that was not set in the preceding topology.

When the nodes A to C have received the self ID packet SP transmitted from the node D, the control unit 42 in each of the nodes A to C performs steps S10 to S14. In this case, the first identification number ID1 (=4) conforms to the third identification number ID3 (=4) of the node (YES in step S14). Thus, the control unit 42 increments the value of the third identification number ID3 to "5" (step S16). Then, the control unit 42 increments the self ID count value Q and returns to step S4. The control unit 42 in each of the nodes E and F in which the node ID has been set performs steps S10 to S13 and returns to step S4.

Subsequently, a node ID is set for the next node C. In the control unit 42 in the node C, the same flag "same" is set to "0" in step S17 (YES in step S7) and the normal flag nrml is set to "0" (NO in step S8). Thus, the identification number generation unit 40 in the node c provides the packet generation unit 37 with the third identification number ID3 (=5) as the physical ID number PID (step S21). In this state, the same flag "same", which is "0", is output from the register 46 to the packet generation unit 37. Then, the node C transmits the self ID packet SP to notify the other nodes A, B, and D to F of the physical ID number PID (=5), which has changed from the node ID before the bus reset, and information (same=0) indicating that the bus reset has changed the node ID as illustrated in FIG. 11. This sets the node ID of the node C to "5".

When the nodes A and B have received the self ID packet transmitted from the node C, the first identification number ID1 (=5) conforms to the third identification number ID3 (=5) (YES in step S14). Thus, the control unit 42 in each of the nodes A and B increments the value of the third identification number ID3 to "6" (step S16).

Then, the remaining nodes B and A do not receive the first identification number ID1 that conforms to the second identification number ID2 before the self ID packet SP generated by the nodes is transmitted. Thus, the second identification number ID2 is set as the node IDs of the nodes B and A. More specifically, the nodes B and A transmit the self ID packet SP to notify the other nodes of the physical ID number PID (=ID2), which is the same as the node ID before the bus reset, and information (same=1) indicating that the bus reset has not changed the node ID, as illustrated in FIG. 11. This sets the node ID of the node B to "2", which is the same as the value before the bus reset. Finally, the node ID of the root node A is set to "3", which is the same as the value before the bus reset.

When the configuration is completed in such a manner (YES in step S4), the control unit 42 in each of the nodes A to F sets the current device quantity Dev (=6) to the third identification number ID3 (step S30). Subsequently, in all of the nodes A to F, the bus reset flag BR remains at the initial value of "0" (NO in step S31). Thus, the same flag is reset to "1" and the normal flag nrml is reset to "0" in each of the nodes A to F (step S32). As a result, when a bus reset occurs again, the nodes A to F operate so that the bust reset does not change the node IDs.

As described above, when the nodes E and F are added to the network system illustrated in FIG. 10, the nodes A and B are set to the same node IDs as those before the bus reset, while the node IDs of the nodes C and D are changed as a result of the bus reset. The self ID packet SP of same=0 is transmitted from each of the nodes C and D, of which the node IDs have been changed as a result of the bus reset, and the newly added nodes E and F (NO in step S41 in FIG. 8). Thus, each of the nodes A to F acquires device information and checks the device information for the nodes C to F, which transmit the self ID packet SP of same=0 (step S42). Then, when the communication establishment processing is completed (step S43), data communication is restarted (step S44).

In this manner, even when the new nodes E and F are added, the device information recognition processing is performed on the nodes E and F, which have been added, and the nodes C and D, in which the node IDs have been changed as a result of the bus reset. This minimizes delays when restarting data communication. More specifically, changes in the nodes ID as a result of a bus reset are decreased, and the device information recognition processing after bus resetting is shortened. This readily restarts data communication after bus resetting.

Next, the operations performed when a node G is added to the network system illustrated in FIG. 10 will now be described with reference to FIG. 12. In the illustrated example, the port circuit 20*a* of the node G, which includes the IPC 10 illustrated in FIG. 1, is newly added to the port circuit 20*b*.

When the node G is added, a bus reset occurs to start bus configuration (step S2 in FIG. 6), set some of the parameters to certain values (step S3), and determine one node (in this example, the node C) as the root node. Then, the setting of node IDs is started for the nodes.

Figure 12:
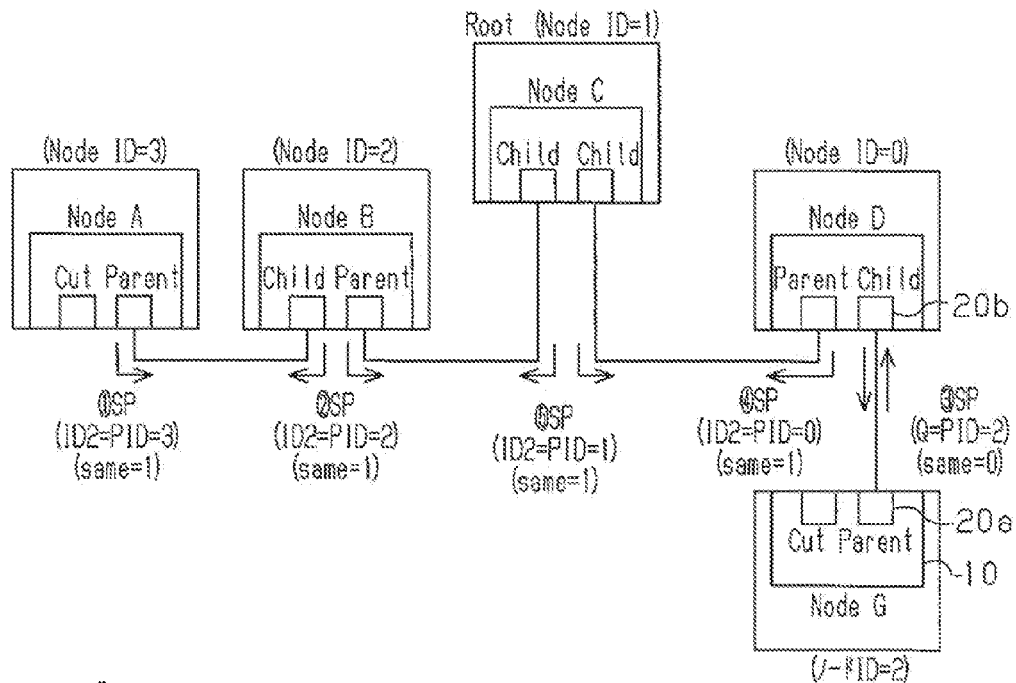

As illustrated in FIG. 12, the leaf node (in this example, the node A) that receives the grant signal first starts transmission of a self ID packet SP. The leaf node A does not receive a self ID packet SP from another node. Thus, the same flag "same" in the node A remain at "1" (NO in step S7 in FIG. 6). As a result, the second identification number ID2 (=3) is output as a physical ID number PID to the packet generation unit 37 (step S20). Then, as illustrated in FIG. 12, the node A broadcasts the self ID packet SP including the physical ID number PID (=3), which is the same as the node ID before the bus reset, and information indicating that the bus reset has not changed the node ID. This sets the node ID of the node A to "3", which is the same as the value before the bus reset.

When the nodes B to D and G receive the self ID packet SP transmitted from the node A, the control unit 42 in each of the nodes B to D and G performs steps S10 to S15. This sets the self ID count value Q in each of the nodes B to D and G to "1".

Subsequently, a node ID is set for the next node B. In the same manner as the node A, the same flag "same" is also "1" in the node B. Thus, the second identification number ID2 (=2) is output as the physical ID number PID to the packet generation unit 37. Then, as illustrated in FIG. 12, the node B broadcasts the self ID packet SP, which includes the physical ID number PID (=2), and information of the same flag "same" (=1). This sets the node ID of the node B to "2", which is the same as the value before the bus reset.

When the nodes C, D, and G receive the self ID packet SP transmitted from the node B, the control unit 42 in each of the nodes C, D, and G performs steps S10 to S15. This sets the self ID count value Q in each of the nodes C, D, and G to "2".

Subsequently, the next node G (added node) transmits the self ID packet SP. In this state, in the node G, the same flag "same" is set at the initial value "0" (YES in step S7 in FIG. 6) and the normal flag nrml is set at the initial value "1" (YES in step S8). Thus, in the node G, the current self ID count value Q (=2) is set to the second identification number ID2 and the self ID count value Q is output as a physical ID number PID to the packet generation unit 37 (step S9). Then, as illustrated in FIG. 12, the node G broadcasts the self ID packet SP, which includes the physical ID number PID (=2) and information of the same flag "same" (=0). This sets the node ID of the node G to "2".

When the node B receives the self ID packet SP transmitted from the node G, the control unit 42 in the node B performs steps S10 to S12 in FIG. 7. In this case, the first identification number ID1 (=2) conforms to the second identification number ID2 (=2) of the node B (YES in step S12). Thus, the control unit 42 in the node B sets the same flag "same" to "0" (step S17). Subsequently, in the node B, in which the node ID has been set, the transmission completion flag TXE is set to "1" (YES in step S18). Thus, the bus reset flag BR is set to "1", and the normal flag nrml is set to "1" (step S19).

Then, the remaining nodes D and C do not receive the first identification number ID1 that conforms to the second identification number ID2 before the self ID packet SP generated by each node is transmitted. Thus, the second identification number ID2 is set as the node IDs of the nodes. That is, the nodes D and C broadcast the self ID packet SP including the physical ID number PID, which is the same as the node ID before the bus reset, and information (same=1) indicating that the bus reset has not changed the node ID, as illustrated in FIG. 12. This sets the node ID of the node D to "0". Finally, the node ID of the root node C is set to "1".

The node IDs of all of the nodes A to D and G are automatically set. However, in this case, the same node ID (=2) is set to the nodes B and G. That is, in the network system including the nodes A to D and G, there are two node IDs having the value of "2". Thus, the network system may not perform normal data communication.

Accordingly, when the same node ID is set twice or more in the network system, the IPC 10 in the present embodiment performs configuration again. In the illustrated example, the IPC 10 (control unit 42) performs configuration when the first identification number ID1 conforms to the third identification ID3 of the node after the node generates and transmits a self ID packet SP (steps S12, S17, S18, and S19 in FIG. 7). More specifically, after the node IDs are set for each of the nodes A to D and G (YES in step S4 in FIG. 6), the bus reset flag BR in the node B is set to "1" in step S19 (YES in step s31). This sets the bus reset request signal BRr to "1", and the second identification number ID2 is set to "3FH" (step S33). When the bus reset request signal BRr is output to the arbitration control unit 32. Thus, the node B causes a bus reset to perform configuration. In the configuration, in the node B that caused the bus reset, the node ID is set in accordance with the self ID count value Q in the conventional manner. In the other nodes A, C, D, and G, the bus reset flag BR is at "0" before the configuration is started (NO in step S31). Further, the same flag "same" is set to "1" and the normal flag nrml is set to "0" (step S32). Thus, in the nodes A, D, C, and G, the node IDs are set so that the bus reset does not change the node IDs. The processing for setting the node IDs will now be described.

When configuration starts as described above (S2 in FIG. 6), some of the parameters are set to certain values (step S3) and one node (in this example, the node C) is determined as the root node. Then, the setting of the node IDs for the nodes is started.

Figure 13:
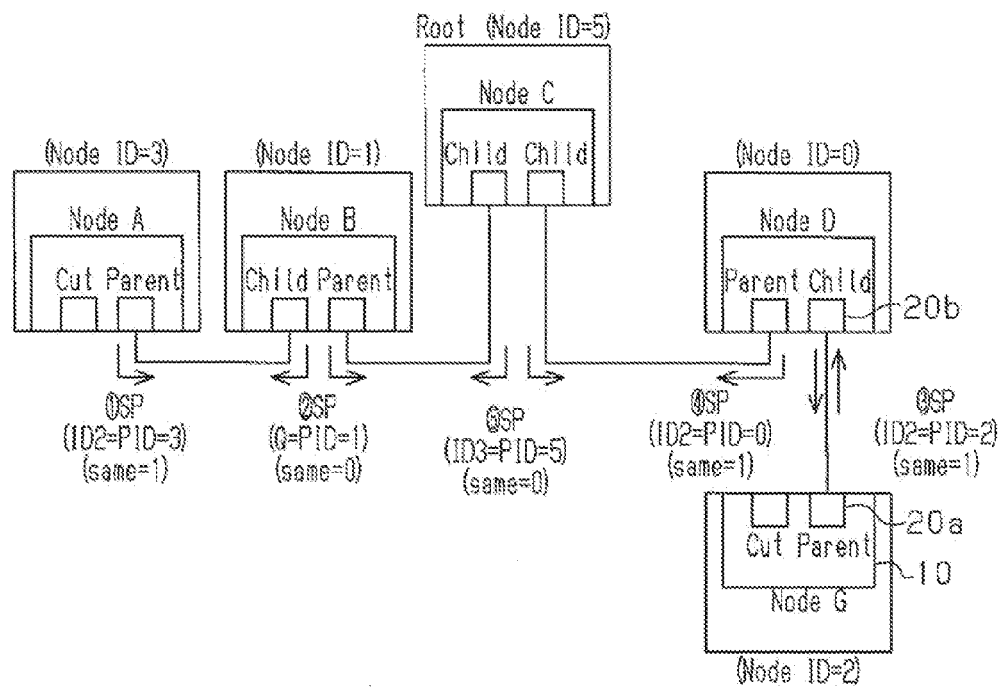

As illustrated in FIG. 13, the leaf node (in this example, the node A) that has received the grant signal first starts transmission of a self ID packet SP. The node A does not receive a self ID packet SP from another node. Thus, in the node A, the same flag "same" remains set at "1" (NO in step S7 in FIG. 6). As a result, the second identification number ID2 (=3) is output as a physical ID number PID to the packet generation unit 37 (step S20). Then, as illustrated in FIG. 13, the node A broadcasts the self ID packet SP including the physical ID number PID (=3), which is the same as the node ID before the bus reset, and information (same=1) indicating that the bus reset has not changed the node ID. This sets the node ID of the node A to "3", which is the same as the value before the bus reset.

When the nodes B to D and G receive the self ID packet SP transmitted from the node A, the control unit 42 in each of the nodes B to D and G performs steps S10 to S15. This sets the self ID count value Q in each of the nodes B to D and G to "1".

Subsequently, a node ID is set for the next node B. In this node B, the same flag "same" is set at "0" (YES in step S7) and the normal flag nrml is set at "1" (YES in step S8). Thus, in the node B, the current self ID count value Q (=1) is set to the second identification number ID2 and the self ID count value Q is output as a physical ID number PID to the packet generation unit 37 (step S9). Then, as illustrated in FIG. 13, the node B broadcasts the self ID packet SP, which includes the physical ID number PID (=1) and information of the same flag "same" (=0). This sets the node ID of the node B to "1".

When the node C receives the self ID packet SP transmitted from the node B, the control unit 42 in the node C performs steps S10 to S12, S17, and S18 in FIG. 7. More specifically, the first identification number ID1 (=1) extracted from the self ID packet SP conforms to the second identification number ID2 (=1) of the node (YES in step S12). Thus, the control unit 42 in the node C sets the same flag "same" to "0" (step S17). Then, the control unit 42 performs steps S14 and S15. Each of the nodes D and G, for which the nodes ID have not been set, performs steps S10 to S15. The nodes A and B, in which the nodes ID have been set, perform steps S10 to S13.

Then, in each of the nodes G and D, the first identification number ID1 that conforms to the second identification number ID2 is not received before the self ID Packet SP generated by the node is transmitted. Thus, the second identification number ID2 is set as the node ID of the node. More specifically, as illustrated in FIG. 13, each of the nodes G and D broadcasts the self ID packet SP including the physical ID number PID, which is the same as the node ID before the bus reset, and information (same=1) indicating that the bus reset has not changed the node ID. This sets the node ID of the node G to "2" and the node ID of the node D to "0".

Finally, in the root node C, a node ID is set. In the control unit 42 of the node C, the same flag "same" is set to "0" in step S17 (YES in step S7) and the normal flag nrml is set to "0" (NO in step S8). Thus, the identification number generation unit 40 outputs the third identification number ID3 (=5) as a physical ID number PID to the packet generation unit 37 (step S21). In this case, the register 46 outputs the same flag "same" set at "0" to the packet generation unit 37. Then, as illustrated in FIG. 13, the node C transmits the self ID packet SP to notify the other nodes A, B, D, and G of the physical ID number PID (=3) changed from the node ID as a result of the bus reset and information (same=0) indicating that the node ID has changed as a result of the bus reset. This sets the node ID of the root node C to "5".

In this manner, when configuration is performed again, the node IDs of the nodes A to D and G are set so that they are not used twice or more. This prevents the same node ID from being used twice or more. Even when the root node is changed as a result of the configuration, in the same manner, the node ID of each of the nodes A to D and G is set so as not to be used twice or more. Thus, the node ID is prevented from being used twice or more. This enables normal data communication.

The present embodiment has the advantages described below.

x(1) In each node of a network, when the node ID included in a self ID packet SP received from another node, namely, the first identification number ID1, does not conform to the second identification number ID2, which is the preceding node ID, the IPC 10 of the node sets the second identification number ID2 as the node ID. Further, the node transmits the self ID packet SP to notify the other nodes of the second identification number ID2, which is set as the node ID of the node and information (same=1) indicating that the node ID of the node has not been changed. Thus, even when a bus reset occurs due to, for example, noise, the node may set a node ID that is the same as the one before the bus reset as its node ID. Further, other nodes receiving the self ID packet SP that includes same=1 may determine that the node ID of the transmission source node of the self ID packet SP has not changed. This allows for elimination of the device information acquisition processing and recognition processing performed between the nodes of the network. Thus, data communication is readily restarted after a bus reset.

Further, by preparing a buffer having a capacity corresponding to the expected period of noise, data (e.g., image or voice data) may be continuously transferred without interruptions when a bus reset occurs. This improves noise resistance during data communication.

x(2) When the first identification number ID1 conforms to the second identification number ID2 before a node transmits the self ID packet SP, the IPC 10 sets the third identification number ID3, which differs from the current second identification number ID2, as the node ID of the node. Thus, for example, when a node is added to a network system, even if a node ID that is the same as the second identification number ID2 of the corresponding node is set to another node before the node ID of the corresponding node is set, the IPC 10 may set a different node ID for the corresponding node. This prevents the same node ID from being set to a plurality of nodes. Further, in this case, device information acquisition and confirmation processing are performed on the nodes of which node IDs have been changed and on the nodes that have been added. This minimizes the delay to restart data communication when a bus reset occurs.

x(3) When the first identification number ID1 conforms to the second identification number ID2 after the self ID packet SP generated by the corresponding node is transmitted, the IPC 10 sets the bus reset flag BR to "1" (step S19) to perform configuration. Further, in the configuration, the node ID is set in accordance with the self ID count value Q in the conventional manner. Thus, even when the same node ID is set twice or more in the same network system, the bus is initialized and the nodes IDs are reset. This prevents the same node ID from being used twice or more.

x(4) When the first identification number ID1 does not conform to the second identification number ID2, the node ID is not changed as a result of the bus reset. However, this does not mean that the node ID of each node (or one of the nodes) is fixed. Thus, the node ID of each node is automatically assigned by the physical layer of each node (the port circuits 20*a* and 20*b* and the physical layer control circuit 30). Accordingly, the user does not have to manage the node IDs, and a network system may implement a plug-and-play function.

x(5) Further, the node ID may be set by the physical layer of each node. That is, the link layer and the application layer of each node are not involved with the setting of the node ID. Thus, in a node (device) in which the application layer does not operate, the node ID may be set by operating the physical layer. This reduces power consumption of the node (device).

x(6) The information (same=1) indicating that the node ID has not been changed is notified to other nodes. Thus, each node may acquire the information and determined whether or the node ID has been changed. Further, to determine whether or the node ID has been changed, there is no need to prepare a table that associates the device information of the nodes with the node IDs or have a manager node manage the ID node information of each node. Accordingly, there is no need for a memory having a large capacity to determine whether or not a node ID has been changed.

x(7) The information indicating whether or not the node ID has been changed, namely, the same flag "same" is transferred by using the self ID packet SP. Accordingly, the same flag "same" may be notified to other nodes without adding a totally new packet that does not comply with the conventional standard.

x(8) When the first identification number ID1 conforms to the third identification number ID3, a value of the third identification number ID3 is incremented. Thus, even when the node ID is changed in a plurality of nodes, the same node ID is prevented from being used twice or more.

A second embodiment will now be described with reference to FIGS. 14 to 16. A network system of the present embodiment differs from that of the first embodiment in that a topology is formed by a node including the IPC 10 illustrated in FIG. 1 and a node including a conventional IPC 10a. The following description will center on the differences from the first embodiment.

A network system that complies with a certain standard (e.g., the IEEE 1394 standard) will first be described with reference to FIG. 15. A node A1 is coupled by a bus cable 1a to a node B. The node B is coupled by a bus cable 1b to a node C. The node C is coupled by a bus cable 1c to a node D.

The nodes B to D each include the IPC 10 illustrated in FIG. 1 in the same manner as in the first embodiment. The node A includes the conventional IEEE 1394 protocol controller (IPC) 10a. An example of the internal configuration of the IPC 10a will now be described.

Figure 14:
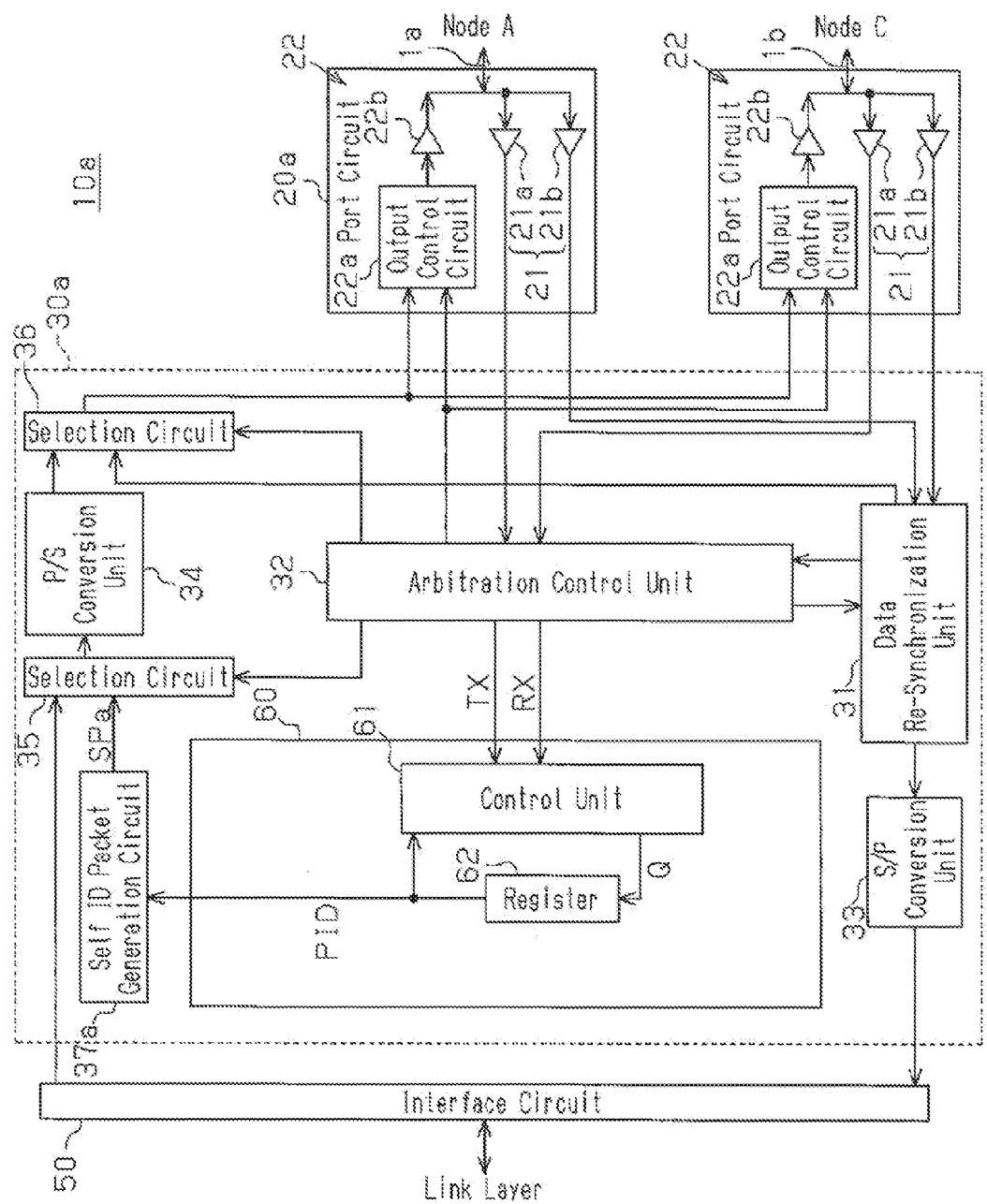
FIG. 14 is a block diagram illustrating a conventional IPC of a single node added to the network system.

As illustrated in FIG. 14, the IPC 10a has the same in configuration as the IPC 10 except for a self ID packet generation unit 37a (packet generation unit) and an identification number generation unit 60. The parts of the IPC 10a identical to those of the IPC 10 will not be described.

The identification number generation unit 60 of a physical layer control circuit 30a includes a control unit 61 and a register 62. The control unit 61 is provided with a transmission permission signal TX and a reception signal RX from the arbitration control unit 32. Whenever receiving the reception signal RX indicating that a self ID packet SP has been received from another node, the control unit 61 increments a self ID count value Q and stores the self ID count value Q in the register 62. Further, when receiving the transmission permission signal TX indicating that transmission of a self ID packet SP generated by the corresponding node is permitted, the control unit 61 provides the packet generation unit 37a with the self count value Q stored in the register 62 as a physical ID number PID.

Figures 15, 16:
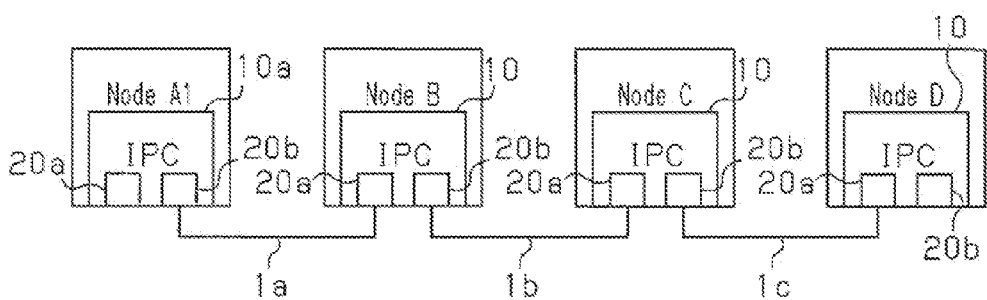
FIG. 15 is a block diagram of a network system according to a second embodiment and including the IPC of FIG. 14.
FIG. 16 illustrates a data format of a self ID packet having no "same" field.

The packet generation unit 37a generates a self ID packet SPa that has the data format illustrated in FIG. 16. In the illustrated example, if the node A1 includes three or less port circuits, the packet generation unit 37a generates a self ID packet SP having a head packet SPa1. If the node A1 includes four or more port circuits, the packet generation unit 37a generates a self ID packet SP having this head packet SPa1 as well as concatenated packets SPa2 and SPa3 in accordance with the number of the port circuits. Further, the packet generation unit 37a generates a self ID packet SPa by storing a physical ID number PID, which is generated in the identification number generation unit 60, in a phy_ID field. The self ID packet SPa does not include a same field and includes an rsv field, which stores a reversed bit of "0", in the corresponding region.

The operations of a network system in which the node A1 including the IPC 10a of FIG. 14 is mixed with the nodes B to D including the IPC 10 of FIG. 1 will now be described with reference to FIGS. 6 to 8 and 17.

Figure 17A:
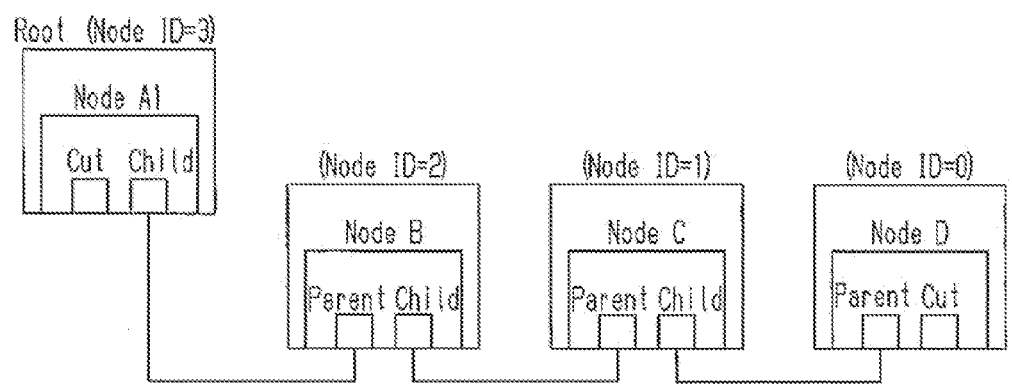
FIGS. 17(a) and 17(b) are explanatory diagrams illustrating a process for setting the node ID.

In the network system illustrated in FIG. 17(a), when the nodes A1 and B to D are activated (power_reset), bus configuration (bus initialization, tree identification, and self identification) is started (step S2 in FIG. 6). More specifically, a bus reset first occurs in a bus initialization phase, a tree-shaped topology illustrated in FIG. 17(a) is formed in a tree identification phase, and one of the nodes is determined as a root node in accordance with the activation order and the coupling state. In this example, the node A1 is determined as the root node. Then, in a self identification phase, node IDs are automatically assigned to the nodes A1 and B to D. In this case, the bus configuration is the first one performed after the reset (power_reset). Thus, the node IDs are set for the node B to D also in the same manner as the conventional sequence. Thus, as illustrated in FIG. 17(a), node IDs of "0", "1", "2", and "3" are sequentially set for the nodes D, C, B, and A1.

The operation performed when a bus reset occurs due to noise or the like will now be described.

Figure 17B:
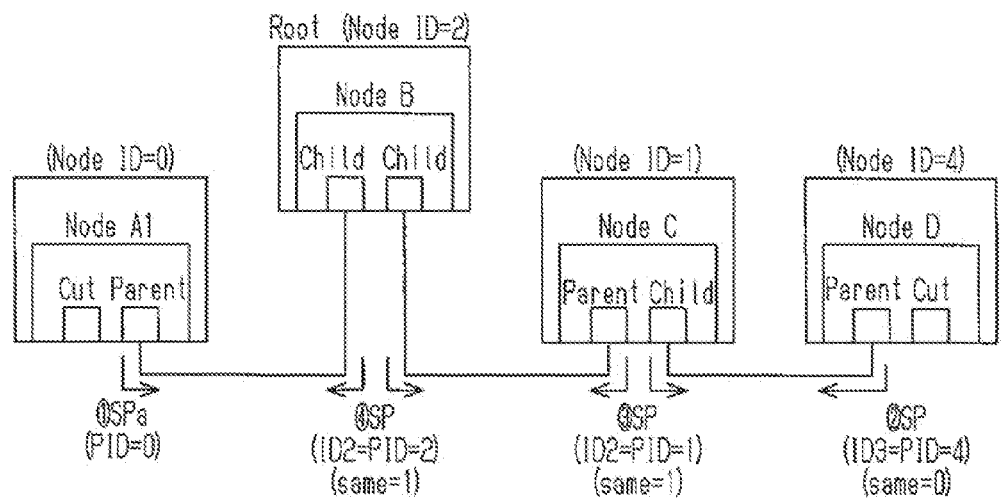

For example, when a loss of synchronization is detected between the nodes B and C due to noise such as static charge on the bus cable 1b coupling the nodes B and C, a bus reset occurs to start bus configuration. More specifically, in the tree identification phase after the bus reset, a tree-shaped topology illustrated in FIG. 17(b) is formed to determine one of the nodes (in this example, the node B) as the root node in accordance with the activation order and the coupling state. That is, in this operation, the topology coupling state is the same as that before the bus reset (see FIG. 17(a)). However, the root node is changed from the node A1 to the node B. Then, in the subsequent self identification phase, node IDs are automatically assigned to the nodes A1 and B to D. The processing for setting the node IDs will now be described in detail.

As illustrated in FIG. 17(b), node IDs are set (self ID packet SPa is transmitted) starting with the leaf node A1 that first receives the grant signal. In this case, the node A1 outputs the current self ID count value Q (=0) as a physical ID number PID to the packet generation unit 37a. Then, the node A1 broadcasts a self ID packet SPa including the physical ID number PID (=0). This sets the node ID of the node A1 to "0".

A control unit 42 in the node D, which received the self ID packet Spa, increments a device quantity Dev (step S11 in FIG. 7) and determines whether or not the first identification number ID1 (=0) extracted from this self ID packet SPa conforms to the second identification number ID2 (=0) of the node (step S12). In this example, conformance is determined (YES in step 12). Thus, the control unit 42 sets the same flag "same" to "0" (step S17). Subsequently, a transmission completion flag TXE is "0" (NO in step S18) and the third identification number ID3 (=4) does not conform to the first identification number ID1 (=1) (NO in step S14). Thus, the control unit 42 increments the self ID count value Q and returns to step S4. The other nodes B and C perform steps S10 to S15. This sets the self ID count value Q in each of the nodes B to D to "2" (step S15).

Subsequently, a node ID is set for the next node D. In the control unit 42 of the node D, the same flag "same" is set to "0" in step S17 (YES in step S7) and the normal flag nrml is set to "0" (NO in step S8). Thus, an identification number generation unit 40 in the node D outputs the third identification number ID3 (=4) as a physical ID number PID to the packet generation unit 37 (step S21). In this case, the same flag "same" set at "0" is output from the register 46 to the packet generation unit 37. Then, as illustrated in FIG. 17(b), the node D transmits the self ID packet SP to notify the other nodes A1, B, and C of the physical ID number PID (=4) that differs from the node ID before the bus reset and information indicating that the node ID has been changed as a result of the bus reset. This sets the node ID of the node D to "4".

Then, in each of the remaining nodes C and B, the first identification number ID1 that conforms to the second identification number ID2 is not received before the self ID packet generated by the node is transmitted. Thus, the second identification number ID2 is set as the node ID of each node. More specifically, as illustrated in FIG. 17(b), the nodes C and B each transmit the self ID packet SP to notify the other nodes of the node ID that is the same as that before the bus reset and information (same=1) indicating that the node ID has not changed as a result of the bus reset. This sets the node ID of the node B to "2", which is the same as the value before the bus reset. Finally, the node ID of the root node A is set to "3", which is the same as the value before the bus reset.

As described above, the node ID of each of the nodes B and C is set to the same node ID as the value before the bus reset. The node ID of the node D and that of the node A1 including the conventional IPC 10*a* are changed as a result of the bus reset. The node D of which node ID is changed as a result of the bus reset transmits a self ID packet SP having same=0, while the node A1 transmits a self ID packet SPa having the same field (NO in step S41 in FIG. 8). Thus, the nodes A1 and B to D perform device information acquisition and confirmation on those nodes A1 and D (step S42). Then, when communication establishment processing is completed (step S43), data communication is restarted (step S44).

In such a manner, even when forming a topology including the conventional node A1, device information recognition processing needs to be performed on the conventional node A1 and the node D, of which the node ID has been changed as a result of the bus reset. This minimizes delays for restarting data communication.

In addition to advantages (1) to (8) of the first embodiment, the present embodiment has the advantages described below by including the IPC of FIG. 1 in one or more nodes.

x(9) When the first identification number ID1 conforms to the second identification number ID2 before a self ID packet SP generated by the node is transmitted, the node including the IPC 10 sets the third identification number ID3, which differs from the current second identification number ID2, as the node ID. Thus, for example, when the conventional node A1 is mixed in the network system, even if the node A1 sets a node ID that is the same as the second identification number ID2, a node including the IPC 10 may set a different node ID. Accordingly, even if the conventional node A1 is mixed in the network, the same node ID is prevented from being set twice or more, and node IDs are automatically assigned to the nodes without any trouble. Further, the device information acquisition and confirmation processing needs to be performed on the conventional node and the node of which the node ID has been changed. This minimizes delays for restarting data communication.

x(10) The self ID packet SP generated in the packet generation unit 37 has generally the same data format as that of the conventional self ID packet SPa except in that the rsv field of the conventional self ID packet SPa is partially replaced by the same field. Therefore, the self ID packet SP may be transferred without trouble between a node that does not include the exemplified IPC 10 but includes the conventional IPC 10*a* and a node including the exemplified IPC 10.

It should be apparent to those skilled in the art that the present invention may be embodied in many other specific forms without departing from the spirit or scope of the invention. Particularly, it should be understood that the present invention may be embodied in the following forms.

In the above embodiments, the device quantity Dev, which indicates the total number of the nodes in the preceding topology, is set in the third identification number ID3, but any value may be set as long as it is not set used as the node ID set for another mode. For example, the maximum value (=62) of the node ID may be set as the third identification number ID3. In this case, the processing in step S16 is changed to decrement the value of the third identification number ID3. Further, in this case, step S11 (see FIG. 7) may be eliminated.

Steps S14 and S16 (see FIG. 7) in the above embodiments may be eliminated.

In the above embodiments, when the first identification number ID1 conforms to the second identification number ID2 before the self ID packet SP generated by a node is transmitted, the third identification number ID3, which differs from the second identification number ID2, is set as the node ID of the node but not limited in such a manner. For example, when the first identification number ID1 conforms to the second identification number ID2 before the self ID packet SP generated by the node is transmitted, the same configuration as that when bus resetting occurs may be performed.

The internal configuration of the identification number generation unit 40 in the embodiments is not restricted to the circuit in FIG. 1.

The information of the same flag "same" in the embodiments may be notified to the other nodes by using a packet that differs from the self ID packet SP.

In the above the embodiments, each IPC 10 includes the two port circuits 20*a* and 20*b* but may include three or more port circuits instead.

In the above embodiments, there is no particular limit to the number of the nodes in a network.

In the above embodiments, the nodes A to G are devices complying with the IEEE 1394 standard. Instead, the nodes A to G may be devices complying with, for example, the IDB-1394 standard or the USB standard.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device in a network comprising:
 a comparison unit configured to compare a first identification number provided by a packet and a second identification number, wherein the second identification is assigned as an identification number of the communication device; and
 a control unit configured to:
  when the first identification number and the second identification number are in non-conformance, notify at least one node that the identification number of the communication device has not been changed; and
  when the first identification number and the second identification number are in conformance, change the identification number of the communication device to a third identification number, the third identification number being different from the second identification number.

2. The communication device according to claim 1, wherein when the first identification number and the second identification number are in conformance, the control unit is further configured to notify the at least one node of the change in the identification number and of the third identification number.

3. The communication device according to claim 1, wherein the third identification number is a number of the nodes in a preceding network topology.

4. The communication device according to claim 1, wherein when the first identification number and the second identification number are in conformance subsequent to transmission of a second packet configured to provide the identification number of the communication device, the control unit is further configured to initialize a bus and to set the identification number of the communication device as a count value based on packets received from the other nodes.

5. The communication device according to claim 3, wherein the control unit is further configured to:
   compare the first identification number and the third identification number, wherein the third identification number is the identification number of the communication device; and
   increment a value of the third identification number when the first identification number and the third identification number are in conformance.

6. The communication device according to claim 1, wherein the control unit is further configured to notify the other nodes that the identification number of the communication device has not been changed or has been changed.

7. The communication device according to claim 1, wherein the comparison unit and the control unit are arranged in a physical layer.

8. The communication device according to claim 1, wherein:
   the control unit includes:
      a first register configured to store the second identification number;
      a second register configured to store a comparison result of the first identification number and the second identification number; and
      a self ID packet generation unit;
   the comparison unit being further configured to:
      receive the packet and extract the first identification number from the received packet;
      compare the extracted first identification number with the second identification number stored in the first register; and
      store a comparison result of the first identification number and the second identification number in the second register; and
   wherein the self ID packet generation unit is configured to generate a self ID packet when the first identification number and the second identification number are in non-conformance, wherein the self ID packet comprises the comparison result and the second identification number.

9. A network system comprising a plurality of nodes, wherein at least one of the plurality of nodes comprises:
   a comparison unit configured to compare a first identification number provided by a packet, and a second identification number, wherein the second identification number is assigned to the at least one of the plurality of nodes; and
   a control unit configured to:
      notify other nodes of the plurality of nodes that the second identification number has not been changed when the first identification number and the second identification number are in non-conformance; and
      when the first identification number and the second identification number are in conformance, change the identification number of the at least one of the plurality of nodes to a third identification number, the third identification number being different from the second identification number.

10. A method for performing communication in a network, the method comprising:
    comparing a first identification number provided by a packet and a second identification number, wherein the second identification is assigned as an identification number of a first node; and
    notifying at least a second node that the identification number of the first node has not been changed when the first identification number and the second identification number are in non-conformance; and
    changing the identification number of the first node to a third identification number, the third identification number being different from the second identification number when the first identification number and the second identification number are in conformance.

11. The communication device according to claim 1, wherein:
    the first identification number and the second identification number are in conformance when a value of the first identification number matches a value of the second identification number; and
    the first identification number and the second identification number are in non-conformance when a value of the first identification number differs from a value of the second identification number.

12. The network system according to claim 9, wherein when the first identification number and the second identification number are in conformance, the control unit is further configured to the other nodes of the plurality of nodes of the change of the identification number of the at least one of the plurality of nodes.

13. The network system according to claim 9, wherein:
    the first identification number and the second identification number are in conformance when a value of the first identification number matches a value of the second identification number; and
    the first identification number and the second identification number are in non-conformance when a value of the first identification number differs from a value of the second identification number.

14. The method according to claim 10, further comprising notifying at least the second node of the change of the identification number of the first node when the first identification number and the second identification number are in conformance.

15. The method according to claim 10, wherein:
    the first identification number and the second identification number are in conformance when a value of the first identification number matches a value of the second identification number; and
    the first identification number and the second identification number are in non-conformance when a value of the first identification number differs from a value of the second identification number.

* * * * *